United States Patent
Krishnaswamy

(10) Patent No.: US 10,487,202 B2
(45) Date of Patent: *Nov. 26, 2019

(54) COMPOSITION COMPRISING POLYPROPYLENE AND POLYOL, AND METHOD OF MAKING THE SAME

(71) Applicant: Braskem America, Inc., Philadelphia, PA (US)

(72) Inventor: Rajendra Krishnaswamy, Pittsburgh, PA (US)

(73) Assignee: Braskem America, Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,732

(22) Filed: Nov. 9, 2018

(65) Prior Publication Data

US 2019/0136025 A1    May 9, 2019

Related U.S. Application Data

(63) Continuation of application No. 15/501,382, filed as application No. PCT/US2015/044211 on Aug. 7, 2015, now Pat. No. 10,155,860.

(Continued)

(51) Int. Cl.
| | |
|---|---|
| *C08L 23/12* | (2006.01) |
| *B29C 48/92* | (2019.01) |
| *C08K 5/14* | (2006.01) |
| *C08J 3/20* | (2006.01) |
| *B29B 7/20* | (2006.01) |
| *C08L 23/16* | (2006.01) |

(Continued)

(52) U.S. Cl.
CPC .............. *C08L 23/12* (2013.01); *B29B 7/20* (2013.01); *B29C 48/286* (2019.02); *B29C 48/297* (2019.02); *B29C 48/92* (2019.02); *C08J 3/203* (2013.01); *C08J 3/2056* (2013.01); *C08K 5/14* (2013.01); *C08L 23/10* (2013.01); *C08L 23/142* (2013.01); *C08L 23/16* (2013.01); *C08L 67/04* (2013.01); *C08L 69/00* (2013.01); *B29K 2023/12* (2013.01); *C08J 2323/12* (2013.01); *C08J 2469/00* (2013.01)

(58) Field of Classification Search
CPC ........ C08L 23/12; C08L 23/16; C08L 23/142; C08L 23/10; C08L 69/10; C08L 67/04; C08L 69/00; C08K 5/14; B29B 7/20; C08J 3/2056; C08J 3/203; C08J 2469/00; C08J 2323/12; B29C 48/92; B29C 48/286; B29C 48/297
USPC ......................................................... 524/379
See application file for complete search history.

(56) References Cited

U.S. PATENT DOCUMENTS

| | | | |
|---|---|---|---|
| 5,204,037 A * | 4/1993 | Fujii | B29C 43/222 264/171.23 |
| 2006/0173108 A1* | 8/2006 | Xu | C08K 5/1575 524/108 |

FOREIGN PATENT DOCUMENTS

| | | | | |
|---|---|---|---|---|
| GB | 2156360 A | * | 10/1985 | ........... A61L 31/143 |
| JP | 2008280361 A | * | 11/2008 | |

* cited by examiner

*Primary Examiner* — Michael Bernshteyn
(74) *Attorney, Agent, or Firm* — Duane Morris LLP

(57) ABSTRACT

A composition includes (a) a polypropylene or a polypropylene copolymer, (b) a polyol, and (c) optionally an organic peroxide. The polyol (b) is in the range of from about 0.01 wt. % to about 25 wt. % of the total weight of (a), (b) and (c). The method of making such a polymer composition, the method of using such a polymer composition, and a sheet or a fabricated article comprising such a polypropylene composition, are also provided.

27 Claims, 21 Drawing Sheets

Related U.S. Application Data

(60) Provisional application No. 62/035,021, filed on Aug. 8, 2014.

(51) Int. Cl.
*C08L 67/04* (2006.01)
*C08L 69/00* (2006.01)
*B29C 48/285* (2019.01)
*C08J 3/205* (2006.01)
*C08L 23/10* (2006.01)
*C08L 23/14* (2006.01)
*B29K 23/00* (2006.01)

US 10,487,202 B2

COMPOSITION COMPRISING POLYPROPYLENE AND POLYOL, AND METHOD OF MAKING THE SAME

RELATED APPLICATIONS

This application is a continuation of U.S. application Ser. No. 15/501,382, filed Feb. 2, 2017, which is a national stage entry of International Application No. PCT/US2015/044211, filed Aug. 7, 2015, which claims the benefit of U.S. Provisional Application No. 62/035,021, filed Aug. 8, 2014, each of which is expressly incorporated by reference herein.

FIELD OF THE INVENTION

The disclosure relates to polymers generally. More particularly, the disclosed subject matter relates to a polymer composition comprising polypropylene, the method of making such a polymer composition, the method of using such a polymer composition, and a sheet or a fabricated article comprising such a polypropylene composition.

BACKGROUND OF THE INVENTION

Polypropylene compositions have gained wide commercial acceptance and usage in numerous applications because of the relatively low cost of the polymers and the desirable properties they exhibit. In general, polypropylene polymers, particularly propylene homopolymers, have a disadvantage of being brittle with low impact resistance, especially at low temperatures. To address these issues, manufacturers have incorporated another material rubber, which forms a dispersed phase within the polypropylene matrix. These two-phase materials are referred to as impact copolymers or ICPs.

On the other hand, polypropylene is nonpolar in chemical nature. A compatibilizer may be needed to blend polypropylene and another relatively polar polymer, mix polypropylene based polymers with fillers such as glass fibers, or apply polypropylene onto a substrate such as wood. It would be desirable to have polypropylene based polymers which are chemically more compatible with other materials while also having improved mechanical properties.

SUMMARY OF THE INVENTION

The present invention provides a composition comprising polypropylene (PP) and a polyol, the method of making such a polymer composition, the method of using such a polymer composition, and a sheet or a fabricated article comprising such a polypropylene composition. The polyol can be any suitable polyol including but are not limited to polycarbonate polyol such as polycarbonate diol and polycarbonate triol, polycaprolactone polyol, alkoxylated polyol, and combinations thereof.

In some embodiments, the composition comprises (a) a polypropylene or a polypropylene copolymer (or ICP); (b) a polyol, and optionally (c) an initiator such as organic peroxide. The polyol (b) is in the range of from about 0.01 wt. % to about 25 wt. %, preferably from about 0.1 wt. % to about 10 wt. %, more preferably from about 0.1 wt. % to about 5 wt. %, of the total weight of (a), (b) and (c). The composition may further comprise an additive or filler.

In some embodiments, no compatibilizer is present between (a) the polypropylene or the polypropylene copolymer; and (b) polyol. The polyol can be a diol, triol, or tetrol, any other polyol or combinations thereof. Examples of the polycarbonate diol include but are not limited to polycarbonate polyol such as polycarbonate diol and polycarbonate triol, polycaprolactone polyol, and alkoxylated polyol. In some embodiments, the polyol is a poly(ethylene) polyol, or a poly(propylene carbonate) (PPC) diol, which is a structurally precise poly(propylene carbonate) diol in some embodiments. The polyol may have any suitable molecular weight, for example, in the range from about 500 g/mol to 50,000 g/mol. For example, a polycarbonate polyol or an alkoxylated polyol may have a molecular weight (Mn) of equal to or less than about 5,000 g/mol, for example, in the range of from about 500 g/mol to about 5,000 g/mol. The polycarbonate diol is a structurally precise poly(propylene carbonate) diol having alternating copolymer structure in some embodiments. For another example, a polycaprolactone polyol may have a molecular weight of in the range of from about 500 g/mol to about 50,000 g/mol (e.g., from about 20,000 g/mol to about 40,000 g/mol). In some embodiments, the polypropylene or the polypropylene copolymer (a) comprises at least one of a polypropylene homopolymer, a random copolymer of propylene, the propylene ICP and blends thereof.

The present disclosure also provides a method of making the composition described above. The method comprises mixing (a) a polypropylene or a polypropylene copolymer; and (b) a polyol as described above. An initiator such as organic peroxide (c) can be optionally mixed with (a) and (b). The polyol (b) is in the range of from about 0.01 wt. % to about 25 wt. % of the total weight of (a), (b) and (c). In some embodiments, the polypropylene or a polypropylene copolymer (a) and the polyol (b) are directly mixed without using any compatibilizer between (a) and (b). In some embodiments, the method comprises reacting the polypropylene or a polypropylene copolymer and the polyol. The polyol (b) is in the range of from about 0.1 wt. % to about 10 wt. % (e.g., from about 0.1 wt. % to about 5 wt. %) of the total weight of (a) and (b). The polyol can be any suitable polyol including but are not limited to polycarbonate polyol such as polycarbonate diol and polycarbonate triol, polycaprolactone polyol, and alkoxylated polyol, with any suitable molecular weight and any suitable hydroxyl number such as diol, triol, or polyol, and combinations thereof. In some embodiments, the polycarbonate polyol is a polycarbonate diol such as a poly(propylene carbonate) diol.

The present disclosure also provides a method of using the composition provided in this invention. Such a composition can be used as a toughness enhancer, a tiger-striping performance enhancer, a gas barrier, a paint adhesion promoter, a compatibilizer between a filler and a polymer or between two polymers, and any other material.

In another respect, the present disclosure provides a fabricated article and a method for making the fabricated article, which comprises the composition described above.

The nonpolar polypropylene based polymer and relatively polar polyol are unexpectedly mixed uniformly, and even react with each other. The composition and the fabricated article provided in this invention exhibit unexpected properties including but not limited to improved rheological properties, mechanical performance, and gas permeation resistance.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION OF THE INVENTION

Figure 1A:
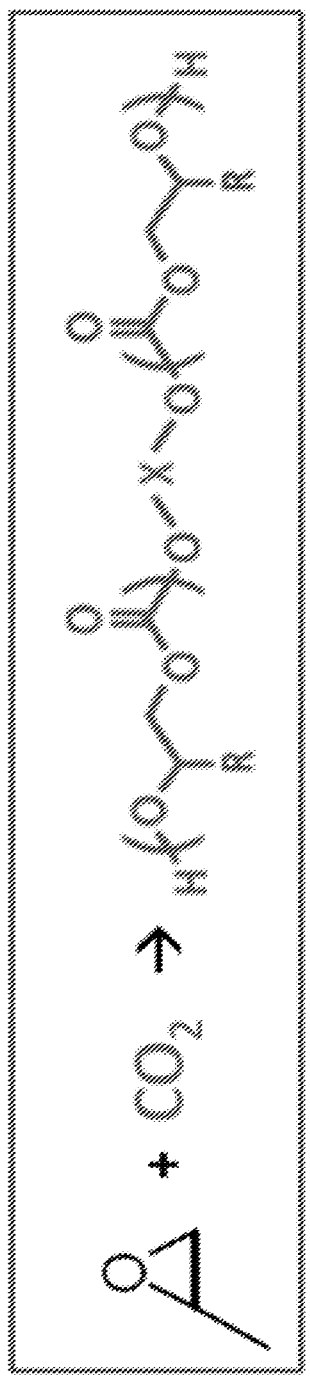
FIG. 1A shows the chemical structure of poly(propylene carbonate) diol or PPC-diol used in some inventive examples.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected," refer to a relationship wherein structures are secured or attached to one another either directly or indirectly through intervening structures, as well as both movable or rigid attachments or relationships, unless expressly described otherwise.

In the present disclosure the singular forms "a," "an," and "the" include the plural reference, and reference to a particular numerical value includes at least that particular value, unless the context clearly indicates otherwise. Thus, for example, a reference to "a polyol" is a reference to one or more of such structures and equivalents thereof known to those skilled in the art, and so forth. When values are expressed as approximations, by use of the antecedent "about," it will be understood that the particular value forms another embodiment. As used herein, "about X" (where X is a numerical value) preferably refers to +10% of the recited value, inclusive. For example, the phrase "about 8" preferably refers to a value of 7.2 to 8.8, inclusive; as another example, the phrase "about 8%" preferably (but not always) refers to a value of 7.2% to 8.8%, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

For purposes of the description hereinafter, it is to be understood that the embodiments described below may assume alternative variations and embodiments. It is also to be understood that the specific articles, compositions, and/or processes described herein are exemplary and should not be considered as limiting.

Polypropylene or a polypropylene based polymer comprises propylene moieties, which are relatively nonpolar in chemical nature. Polypropylene or polypropylene based polymers may have limited compatibility with another relatively polar material such as a polymer, fillers such as glass fibers, and substrates such as wood. Polypropylene based polymers are also commonly used as packaging materials. Improved gas barrier property is also needed.

The inventors have surprisingly determined that a polypropylene based polymer can be blended with a polycarbonate polyol at a certain ratio. Polycarbonate polyol is relatively polar because of the hydroxyl groups on the end of polymer chains or on the side chains. The inventors have also determined a polypropylene based polymer and a polyol such as polycarbonate polyol, polycaprolactone polyol, an alkoxylated polyol or a combination thereof can even react with each other. The resulting compositions and the fabricated articles exhibit unexpected properties including but not limited to improved rheological properties, mechanical performance, compatibility and gas permeation resistance. For example, the composition provided in this disclosure can exhibit excellent anti-tiger (flow) marking performance in large/long molded parts.

The term "polymer," as used herein, refers to a polymeric compound prepared by polymerizing monomers, whether of the same or a different type. The generic term polymer thus embraces the term "homopolymer," usually employed to refer to polymers prepared from only one type of monomer, as well as "copolymer" which refers to polymers prepared from two or more different monomers.

"Polypropylene" shall mean polymers comprising greater than 50% by weight of units which have been derived from propylene monomer. This includes polypropylene homopolymers or copolymers (meaning units derived from two or more comonomers). A "polypropylene based polymer" is a polymer comprising propylene moieties, for example, a homopolymer, a copolymer or a blend comprising propylene moieties or polypropylene.

For brevity, unless expressly indicated otherwise, references to "polycarbonate polyol," made in the present disclosure will be understood to encompass any oligomer or copolymer polymerized from an epoxide monomer and carbon dioxide, which has hydroxyl groups on the ends or on the side chains. Depending functionality of hydroxyl groups on each molecular chain, polycarbonate polyol can be a diol, a triol, a tetrol, or any suitable polyol, or combinations thereof. For example, if such an oligomer or copolymer has functionality of two (i.e. two hydroxyl groups) on each molecular chain, it is a polycarbonate diol. If the functionality is three, such an oligomer or copolymer is a polycarbonate triol. Examples of "polycarbonate diol" include but are not limited to poly (ethylene carbonate) diol, (propylene carbonate) diol, and (butene carbonate) diol.

Unless expressly indicated otherwise, references to "polyol," made in the present disclosure will be understood to encompass any oligomer or copolymer having hydroxyl groups on the ends or on the side chains, and having any suitable molecular weight and hydroxy group content (or number). Examples of a suitable polyol include but are not limited to polycarbonate polyol (e.g., polycarbonate diol, polycarbonate triol); polycaprolactone polyol, and alkoxylated polyol. The polyol may have any suitable molecular weight, for example, in the range from about 500 g/mol to 50,000 g/mol. The number of hydroxyl groups in one molecule of polyol can be any suitable integer including but not limited to 2, 3, 4, 5, 6, 7, 8, 9 and 10. For example, the number (functionality) can be in between 1 and 10.

The term "epoxide", as used herein, refers to a substituted oxirane. Such substituted oxiranes include monosubstituted oxiranes, disubstituted oxiranes, trisubstituted oxiranes, and tetrasubstituted oxiranes.

The term "head-to-tail" ratio is used in its conventional sense with regard to poly(propylene carbonate). Such terms may be used to describe and/or quantify the regioregularity of a polymer or polymer composition.

The terms "structurally precise poly(propylene carbonate) diol" and "poly(propylene carbonate) diol" are used interchangeably. Structurally precise poly(propylene carbonate) diol used in this disclosure can have a high head-to-tail ratio (e.g., >80%) in some embodiments, and can have a high percentage of carbonate linkages (e.g., >90%). Poly(propylene carbonate) diol may also have a narrow polydispersity index. Its molecular weight is less than 5000 g/mol, for example, in the range from 500 to 5000 g/mol in some embodiments.

"Tiger (flow) marking" is defined as a viscoelastic melt flow instability that typically occurs in relatively long injection molded parts, where alternate dull and glossy regions occur beyond a certain distance from the gate (onset distance to flow marks). Tiger marking instability fundamentals have been described in the literature [e.g., Hirano et al., J. Applied Polym. Sci. Vol. 104, 192-199 (2007); Pathan et al., J. Applied Polym. Sci. Vol. 96, 423-434 (2005); Maeda et al., Nihon Reoroji Gakkaishi Vol. 35, 293-299 (2007)]. Tiger marking is highly undesirable due to unacceptable part appearance, especially for large/long injection molded parts. Application number U.S. Ser. No. 13/328,515, titled "Propylene-based compositions of enhanced appearance and excellent mold flowability," filed Dec. 16, 2011, published as U.S. Publication No. 20120157599 A1, which describes the testing of "tiger (flow) marking" and related improvement, is incorporated herein by its entirety.

Unless expressly indicated otherwise, the percentage in the formulations in the present disclosure is by weight.

The present disclosure provides a composition comprising polypropylene (PP) and a polyol at a certain ratio, the method of making such a polymer composition, the method of using such a polymer composition, and a sheet or a fabricated article comprising such a polypropylene composition. The nonpolar polypropylene based polymer and relatively polar polyol are unexpectedly mixed uniformly, and even react with each other. The composition and the fabricated article provided in this invention exhibit unexpected properties including but not limited to improved rheological properties, mechanical performance, and gas permeation resistance.

In some embodiments, the composition comprises (a) a polypropylene or a polypropylene copolymer (or an ICP); and (b) a polyol such as a polycarbonate diol, a poly (ethylene carbonate) polyol, a polycaprolactone polyol, an alkoxylated polyol, or any combination thereof. The composition may also optionally comprise an initiator such as organic peroxide (c). The polyol (b) is in the range of from about 0.01 wt. % to about 25 wt. %, preferably from about 0.1 wt. % to about 10 wt. %, more preferably from about 0.1 wt. % to about 5 wt. %, of the total weight of (a), (b) and (c). In some embodiments, no compatibilizer is present between (a) the polypropylene or the polypropylene copolymer; and (b) polyol. The polyol may have any suitable molecular weight, for example, in the range from about 500 g/mol to about 50,000 g/mol. In some embodiments, a polycarbonate polyol or an alkoxylated polyol may have a molecular weight (Mn) of equal to or less than about 5,000 g/mol (e.g., from about 500 g/mol to about 5,000 g/mol). In some embodiments, a polycaprolactone polyol may have a molecular weight of in the range of from about 500 g/mol to about 50,000 g/mol (e.g., from about 20,000 g/mol to about 40,000 g/mol). The number of hydroxyl groups in one molecule of polyol can be any suitable integer including but not limited to 2, 3, 4, 5, 6, 7, 8, 9 and 10. The composition can further comprise an organic peroxide (c) in the range from about 0.01 wt. % to about 5 wt. %, for example, from about 0.01 wt. % to about 2 wt. % or about 0.1 wt. % to about 1 wt. %. The composition may also comprise any additive or filler at a suitable ratio.

Examples of the polypropylene or the polypropylene copolymer (a) include but are not limited to a polypropylene homopolymer, a random copolymer of propylene, the propylene ICP and blends thereof. For example, a polypropylene (PP) homopolymer (HP) having melt index of 18, a polypropylene (PP) homopolymer (HP) having melt index of 3, and an ICP polypropylene based polymer (e.g., C7100-50NA and TI2350C) are used in the present disclosure. Another example evaluated in the present disclosure is INSPIRE™ 6021N, which is a commercial grade of polypropylene homopolymer sold by Braskem, and has a melt index of 2.

Examples of the polycarbonate polyol such as diol or triol include but are not limited to poly(ethylene carbonate) diol, a poly(propylene carbonate) (PPC) diol, a poly(butene carbonate) (PPC) diol, a poly(propylene carbonate) (PPC) triol, any other suitable polycarbonate polyol, or any combination thereof. In some embodiments, a structurally precise poly(propylene carbonate) diol is used. The structurally precise poly(propylene carbonate) diol may have an alternating copolymer structure in some embodiments.

Polycarbonate polyol is available, for example, from Novomer Inc. of Ithaca, N.Y. Polycarbonate polyol was developed for urethane applications. Using a catalyst system which enables $CO_2$ to react precisely and efficiently with epoxides, Novomer produces highly precise polyols with a unique, "high density" polycarbonate backbone, perfect —OH functionality, and very narrow polydispersity. In urethane applications, these polyols deliver extremely high tensile & flexural strength, excellent chemical & hydrolytic stability, high UV resistance, and very good transparency. As an alternating copolymer of epoxides with $CO_2$ having low polydispersity indices, poly(propylene carbonate) (PPC) and poly(ethylene carbonate) (PEC) polyols can have specific molecular weights, degrees of branching, and hydroxyl end group functionalities.

A suitable polyol can be also a polyester based polyol, for example, a high molecular weight linear polyester having hydroxyl groups, which is derived from one or more caprolactone polyol. Examples of such a suitable polyester based polyol include but are not limited to CAPA™ 6400 available from Perstop Company in Sweden. CAPA™ 6400 has a molecular weight (Mn) of about 37,000 g/mol, a melting point of 59 OC.

Examples of a suitable alkoxylated polyol include any polyol having alkoxyl chain with hydroxyl groups on the ends or in the middle of the alkoxyl chain. For example, Polyol 3165 evaluated in the present disclosure is an alkoxylated polyol available from Perstop Company in Sweden. Polyol 3165, a liquid, is trifunctional with primary hydroxyl groups, and has a molecular weight of about 1010 g/mole and a hydroxyl number of about 165 mg KOH/g.

Furthermore, a suitable polyol can be any hydroxyl functionalized oligomer or polymer. Examples of the backbone structure include but are not limited to polyether, polyester, polyolefin, polyamide, or any other polymers. For example, a polyolefin based polyol can be hydroxyl-terminated polybutadiene.

Figure 1B:
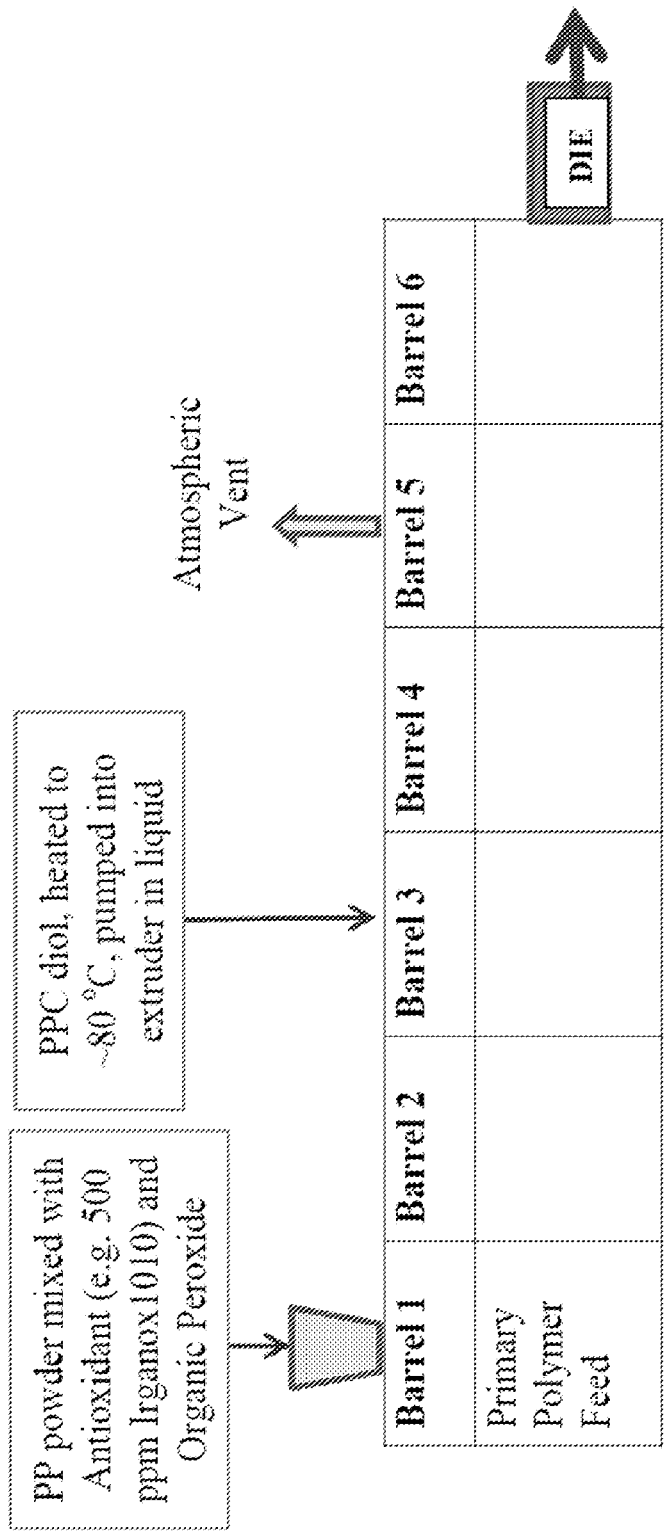
FIG. 1B illustrates a process of making the composition on a twin-screw extruder in some embodiments.

Referring to FIG. 1A, polycarbonate polyol such as poly(propylene carbonate) diol (PPC diol) can be made following the general scheme in accordance with some embodiments. PPC diol is shown for the illustration purpose. The epoxide can be ethylene oxide, propylene oxide, butene oxide, any other oxide or combinations thereof. "X" in the scheme shown in FIG. 1 represents an initiator moiety used in the polymerization. For example, Novomer 211-10, as one of the PPC diols used in this disclosure, has —OH functionality of about 2. The molecular weight is about 1000 g/mol. It comprises 100% polycarbonate backbone. Perfectly alternating $CO_2$/epoxide units provides 100% carbonate with no ether linkage.

Preparation of a PPC diol can be also found in U.S. Pat. No. 8,748,555, which is incorporated herein by reference in its entirety.

The composition provided in this disclosure can optionally comprise a curing agent, a filler, an additive, or any other suitable ingredient, or combinations thereof.

EXPERIMENTAL

Twin-Screw Extrusion

All of the mixtures of PP and the polycarbonate diol was accomplished using a 21 mm Theyson co-rotating twin-screw extruder. The subject PP powder (PP physically blended with anti-oxidant IRGANOX® 1010 and in some examples with an organic peroxide) was fed into the main hopper of the twin-screw extruder using a gravimetric feeder. Unless otherwise specified, all barrel zones were set at 210° C. a screw RPM of 350 was used for all of the PP/PPC-diol blends. The output rate was maintained at about 20 lbs./hr. The schematic shown below describes the melt-extrusion set-up.

Dynamic Melt Rheology

Small amplitude oscillatory shear (SAOS) or torsional melt rheological measurements were conducted using an Anton-Paar MCR501 type stress-controlled rheometer with 25 mm parallel plates using a 2 mm plate gap. Frequency sweep tests were conducted on compounded pellets (~1.5 grams before trimming) at 200° C. The applied strain on the sample during testing was 5% which was within the linear viscoelastic range for these materials. This was verified experimentally by running a strain sweep at a constant applied angular frequency and monitoring the storage modulus, G', as a function of strain. A time sweep test at constant angular frequency also verified that no significant degradation was observed for these samples. The influence of test frequency on complex viscosity, storage modulus (G') and loss tangent or tan-delta will be reported for the examples.

The loss tangent (tan δ) at low angular frequency (e.g. 0.1 and 0.4 rad/s) of the composition is defined here as a metric of tiger marking performance of the standalone composition and its filled compound consistent with the work of Maeda et al. (2007) [Maeda, S., K. Fukunaga, and E. Kamei, "Flow mark in the injection molding of polypropylene/rubber/talc blends," Nihon Reoroji Gakkaishi 35, 293-299 (2007)].

According to the theory, the flow in the front region becomes unstable when the shear stress exceeds the normal stress. Whether flow marks occur or not is controlled by the balance between the normal and shear stresses (related to tan δ) in this region. The validity of this criterion was verified experimentally for the injection molding of polypropylene/rubber/talc blends [Maeda et al. (2007)]. It was found that the enhancement of melt elasticity at low shear rates effectively prevents the occurrence of flow marks on the molded parts [Maeda et al. (2007)].

Rheotens Melt Strength

Melt strength experiments were conducted using a Göttfert Rheo-Tester 2000 capillary rheometer equipped with a Rheotens 71.97 set-up. A 12 mm capillary barrel was used at a barrel temperature of 190° C. The molten polymer is soaked at the test temperature for 5 minutes prior to the test. A polymer strand was pushed through a 20 mm/2 mm L/D capillary die with a 180° entrance angle at an apparent wall shear rate of ~86 $s^{-1}$. The polymer strand is then fed into the Rheotens unit and is grabbed by two sets of two wheels. The wheel speed is adjusted to reduce the acting force on the polymer strand to approximately zero. Once steady-state is achieved, the speed of the counter-rotating wheels is continuously increased, which deforms the polymer strand until fracture. The polymer strand resistance force to deformation is measured by the Rheotens unit. The peak force recorded during the drawing process is referred to as "melt strength".

Differential Scanning Calorimetry (DSC) is a technique that measures heat flows associated with transitions in materials as a function of time and temperature in a controlled atmosphere. Non-isothermal DSC sweeps were performed using a TA Instruments 200 instrument. The specimen was equilibrated at 200° C. for 5 minutes. The melt was then cooled to −50 C at a rate of 10 C/min; the peak temperature of the melt-crystallization exotherm peak was recorded as the crystallization temperature or Tmc. The specimen was then heated back to 200° C. at a rate of 10 C/min and the peak of the melting endotherm was recorded as the melting point or Tm.

Unless specified otherwise, as used herein, the "melt flow rate" (MFR) or "melt index" (units of g/10 min or dg/min) is described according to and measured per ASTM D1238 using a load of 2.16 kg at 230° C.

As used herein, notched Izod impact strength (expressed in ft-lbs/in) was measured at 23° C. as described according to and measured per ASTM D256.

Example-1

Figure 2:
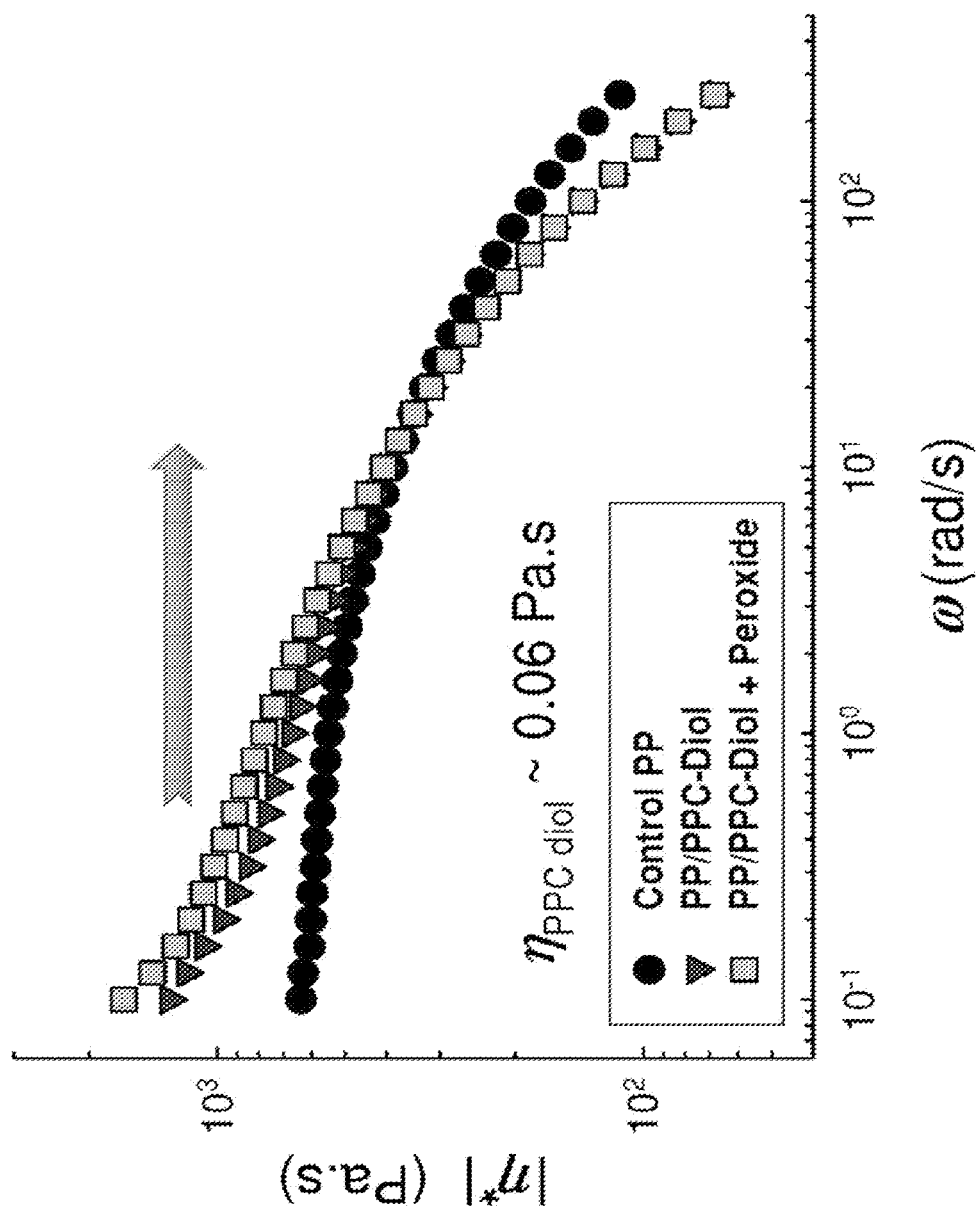
FIG. 2 illustrates the dynamic rheology response (plotted as complex viscosity or Eta* versus measurement frequency at 200° C.) of a polypropylene (PP) as a control, a PP/PPC-diol blend and a PP/PPC-diol blend comprising a peroxide.

Example-1 is a preliminary trial of blending a PP and a PPC diol as shown in FIG. 2. This experiment included characterization of two blends of a PP homopolymer (melt flow of about 30 g/10 min) with PPC-diol (one blend was made with an organic peroxide Trigonox 101). Referring to FIG. 2, a polypropylene (PP) was used as a control. A corresponding PP/PPC-diol blend and a PP/PPC-diol blend comprising a peroxide were studied as inventive compositions. The PPC diol content is approximately 8 wt. % of the total formulation. Based on the torsional rheology data of complex viscosity as a function of angular frequency at 200° C., the PPC diol appears to change the rheological signature of PP significantly, even in the absence of peroxide. PPC diol is a liquid at room temperature and it has a viscosity of about 0.06 Pa·s at 200° C. Even though the viscosity of the PPC diol is several (4+) orders of magnitude lower than that of the control PP at 200° C., the low-shear viscosity of the PP/PPC-diol mixture is significantly higher than that of the individual components. This suggests that a synergistic interaction may exist between the PP and the PPC-diol. The rheological response indicates that the molecular architecture of the PP has been altered substantially; the dramatic increase in the low-shear viscosity at low frequencies suggests the formation of a network-like structure with rheologically significant long branches. Not only is the diol changing the architecture of the PP, it is also changing the composition of the PP by introducing some polarity into the PP.

Example 2

Figure 3:
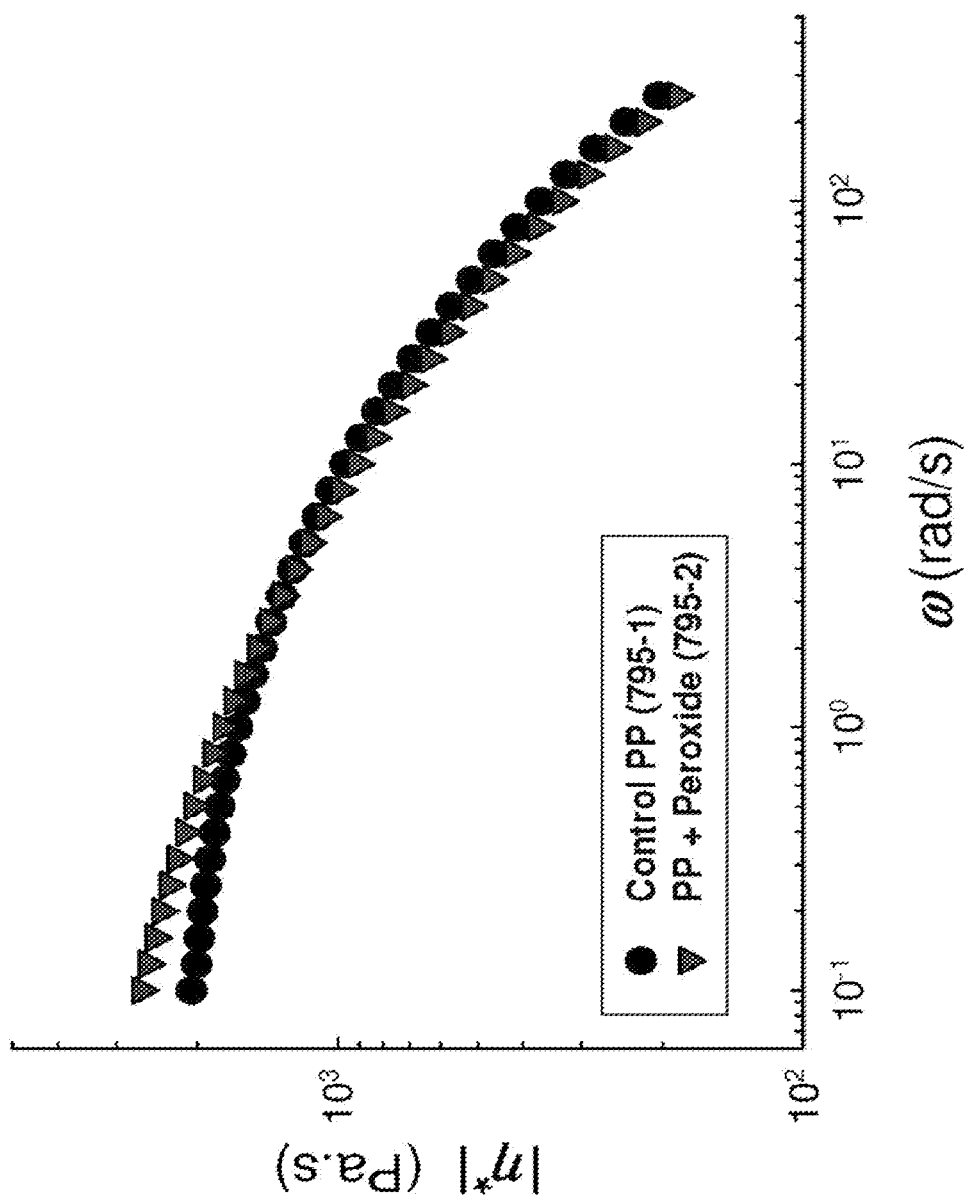
FIG. 3 illustrates the dynamic rheology response of (plotted as complex viscosity or Eta* versus measurement frequency at 200° C.) of a polypropylene (PP) and the PP comprising a peroxide.

In Example 2, the properties of a PP control (homopolymer with a melt flow of 18 g/10 min) are compared with those of PP/PPC-diol blends that contain varying concentrations of the diol including one blend that also contained about 0.5 weight percent of an organic peroxide (PERKADOX® 24L from Akzo Nobel). FIG. 3 shows the torsional rheological response when the control polypropylene (PP homopolymer with a melt flow of about 18 g/10 min) reacts with only the peroxide; a slight increase in low-shear viscosity and a slight decrease in high-shear viscosity is noted for the PP treated with peroxide.

FIGS. 4-8 show the results of comparative and inventive examples in which polypropylene (PP) homopolymer (HP) having melt index of 18 ("18 MFI HP") was used. In the formulations in FIGS. 4-8 (and all other formulations in this application), the percentages of PPC diol is by weight based on the total weight of the formulation.

Figure 4:
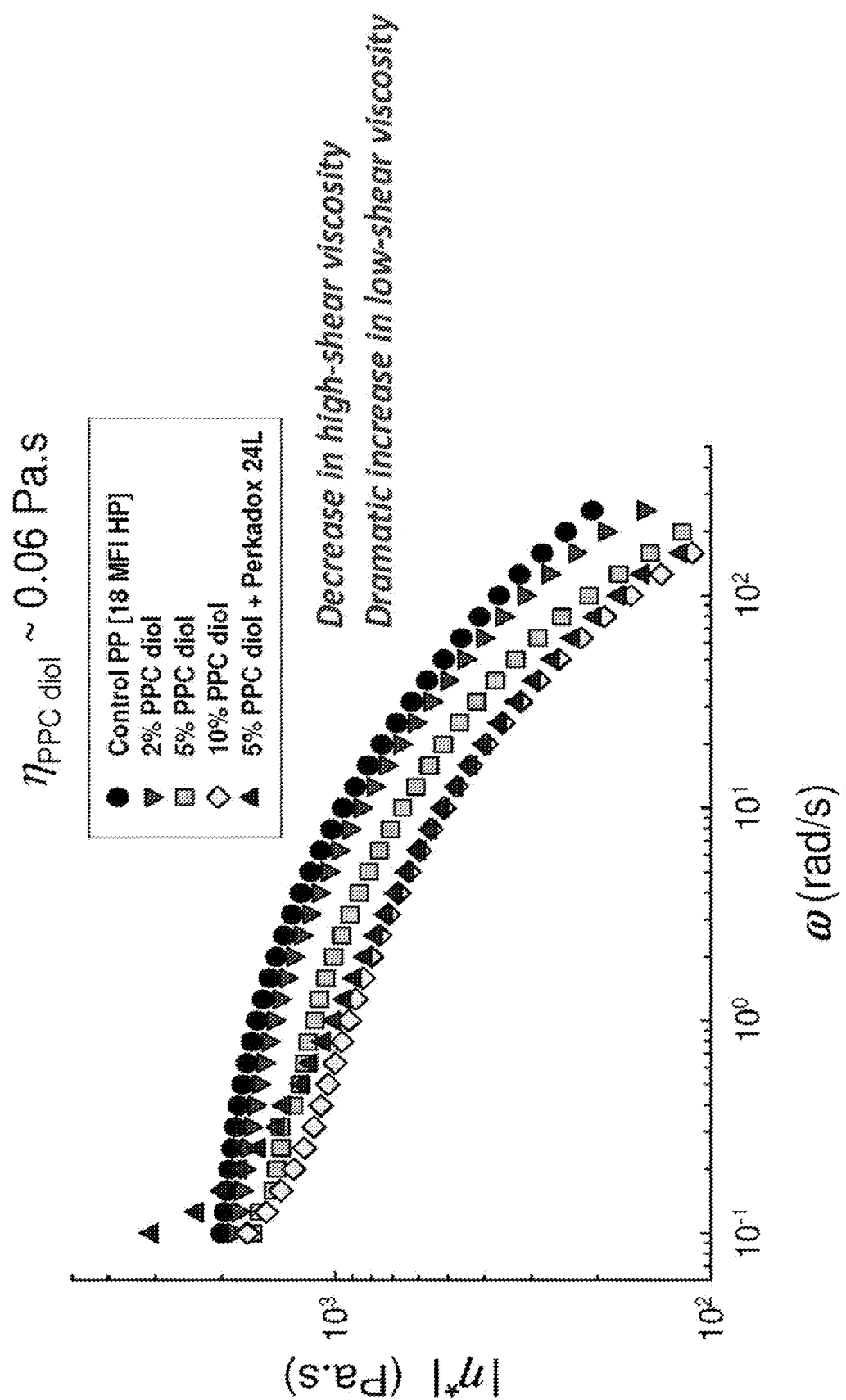
FIG. 4 illustrates the dynamic rheology response (plotted as complex viscosity or Eta* versus measurement frequency at 200° C.) of a polypropylene (PP) homopolymer (HP) having melt index of 18 g/10 min and the PP comprising different levels of PPC diols in accordance with some embodiments.

Referring to FIG. 4, the values of complex viscosity of a comparative example and four inventive examples as a function of angular frequency at 200° C. are shown. A polypropylene (PP) homopolymer (HP) having melt index of 18 ("18 MFI HP") and the same PP comprising different levels of PPC diols were made in accordance with some embodiments. Using PPC diol in PP provides a significant decrease in high-shear viscosity and a dramatic increase in low-shear viscosity. The rheological signature is noted to be dramatically different for the PP/PPC-diol blends (similar to Example-1) with the changes becoming more prominent at higher loading levels of the PPC-diol. The rheological response of the PP/PPC-diol/Peroxide blend (5% PPC-diol with 0.5% PERKADOX® 24L) blend is even more dramatic compared to the PP/PPC-diol 95/5 blend suggesting that the reaction extent between PP and the PPC-diol is enhanced in the presence of the peroxide.

Figure 5:
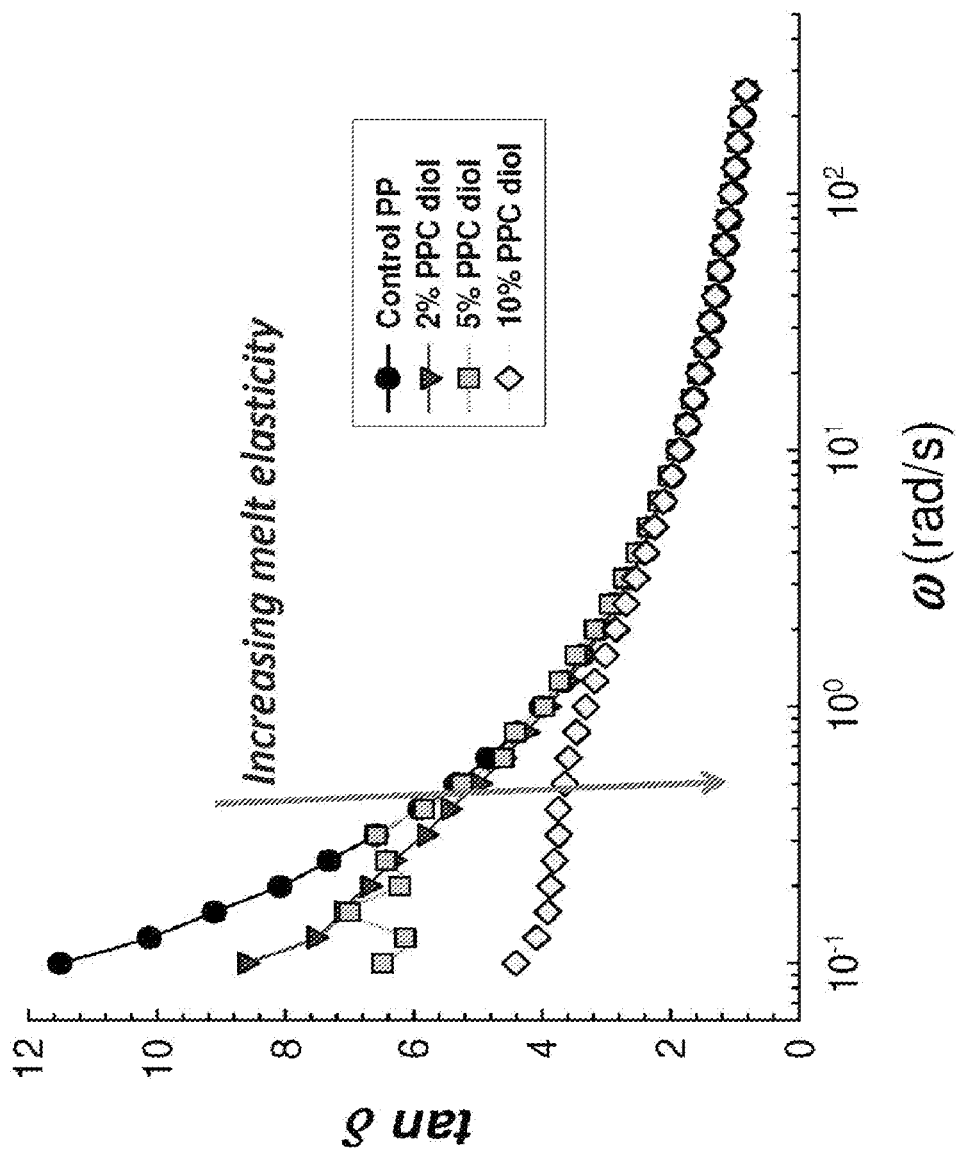
FIG. 5 illustrates the dynamic rheology response (plotted as loss tangent or tan δ versus measurement frequency at 200° C.) of a polypropylene (PP) homopolymer (HP) having melt index of 18 g/10 min and the PP comprising different levels of PPC diols.

As shown in FIG. 5, based on the values of loss tangent (tan δ), the inventive compositions comprising polypropylene (PP) homopolymer (HP) having melt index of 18 and different levels of PPC diols exhibit increasing melt elasticity when the content of the PPC diol increases. The systematic decrease in loss tangent with increasing levels of PPC-diol indicates increasing melt elasticity. The melt elasticity of the PP/PPC-diol blends is higher than that of the control PP and the pure PPC-diol suggesting again a synergistic interaction between the PP and the PPC-diol.

Figure 6:
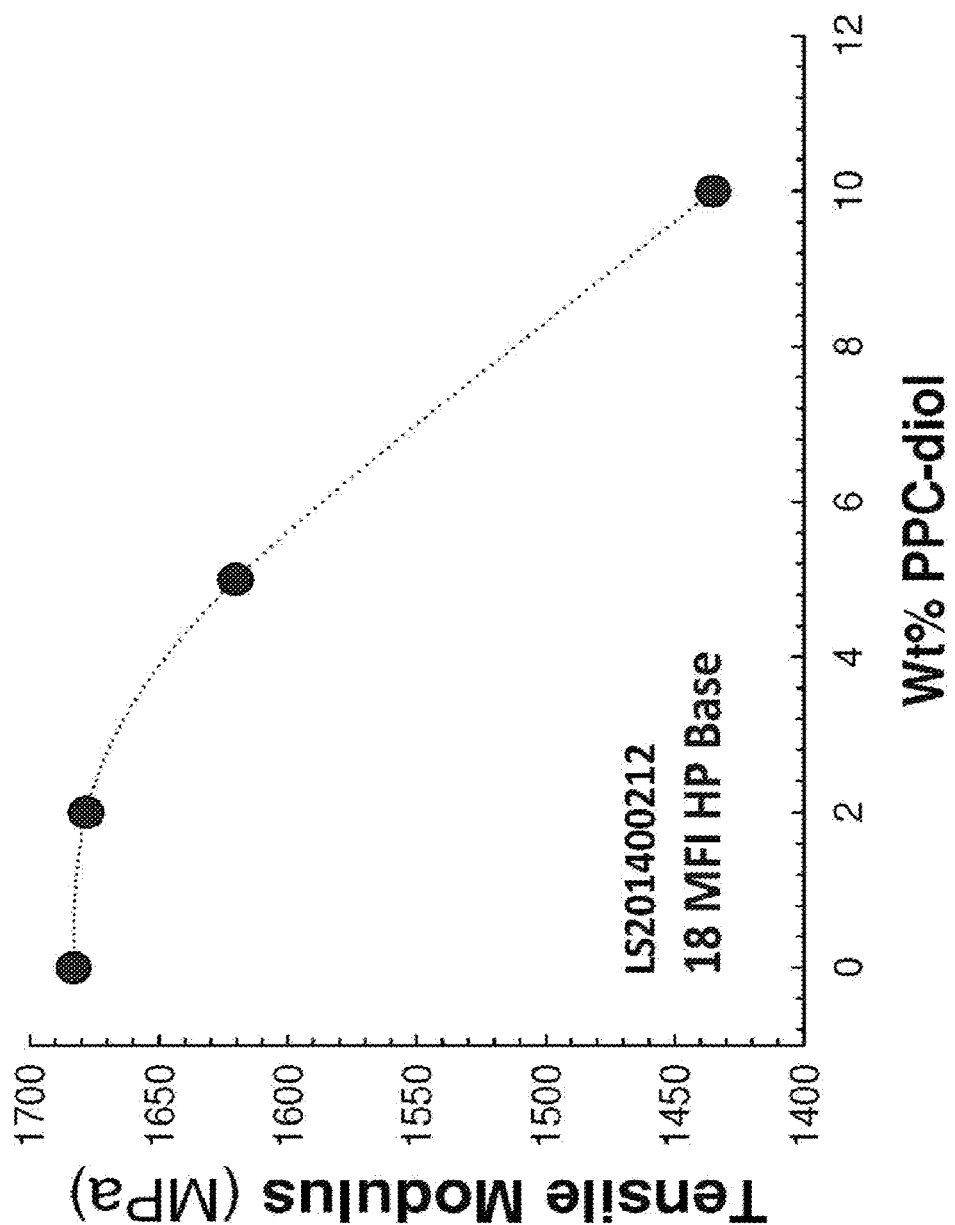
FIG. 6 illustrates tensile modulus of the comparative and inventive compositions of FIG. 4 as a function of the percentage of PPC diol.
Figure 7:
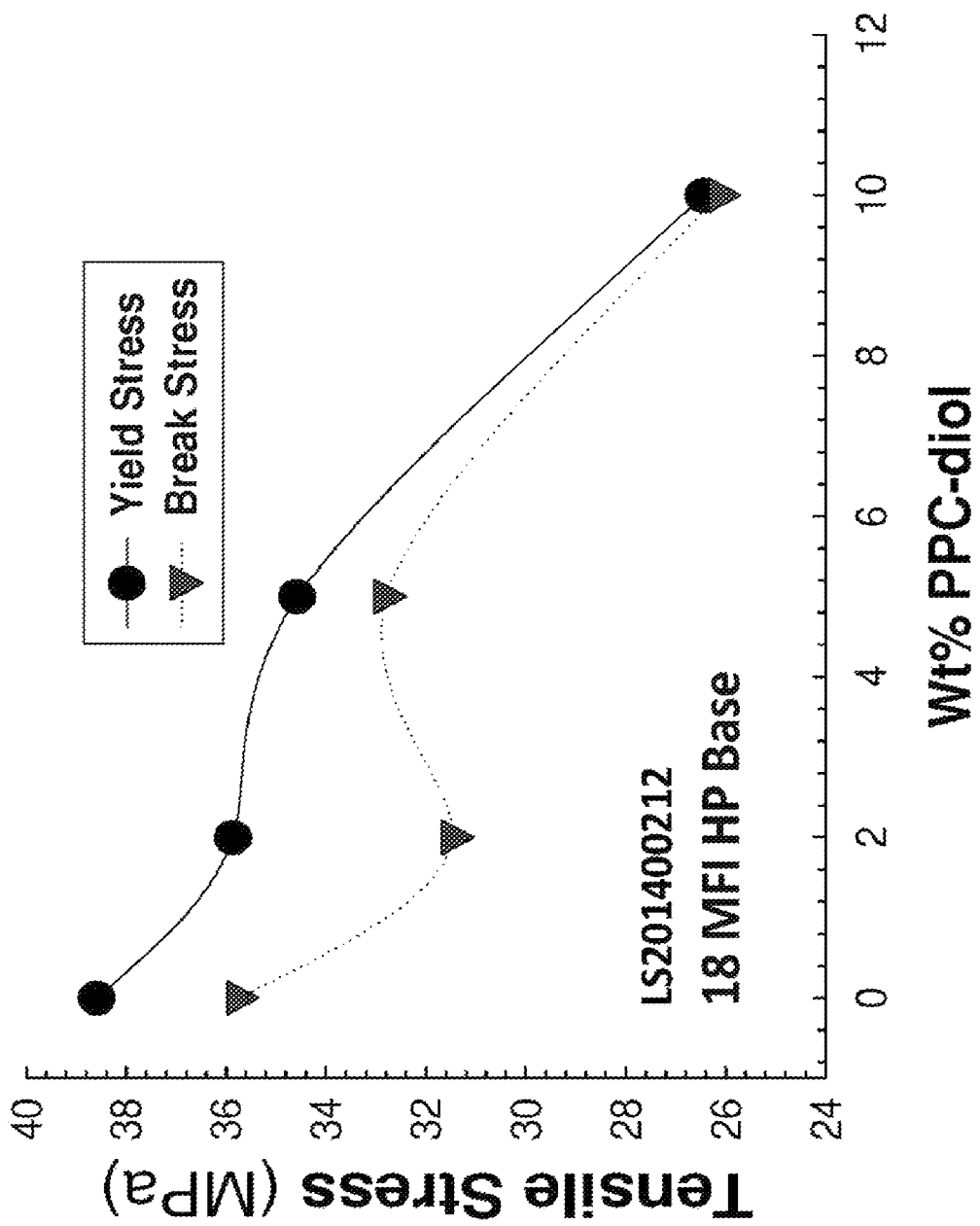
FIG. 7 illustrates tensile stress of the comparative and inventive compositions of FIG. 4 as a function of the percentage of PPC diol.

The blends discussed were also compression-molded into plaques and their tensile properties (secant modulus, yield stress and break stress) were measured. As shown in FIG. 6, with the increase in the content of the PPC diol, tensile modulus of the inventive compositions decreases modestly.

The yield stress and break stress of these inventive compositions also tend to decrease modestly.

Figure 8:
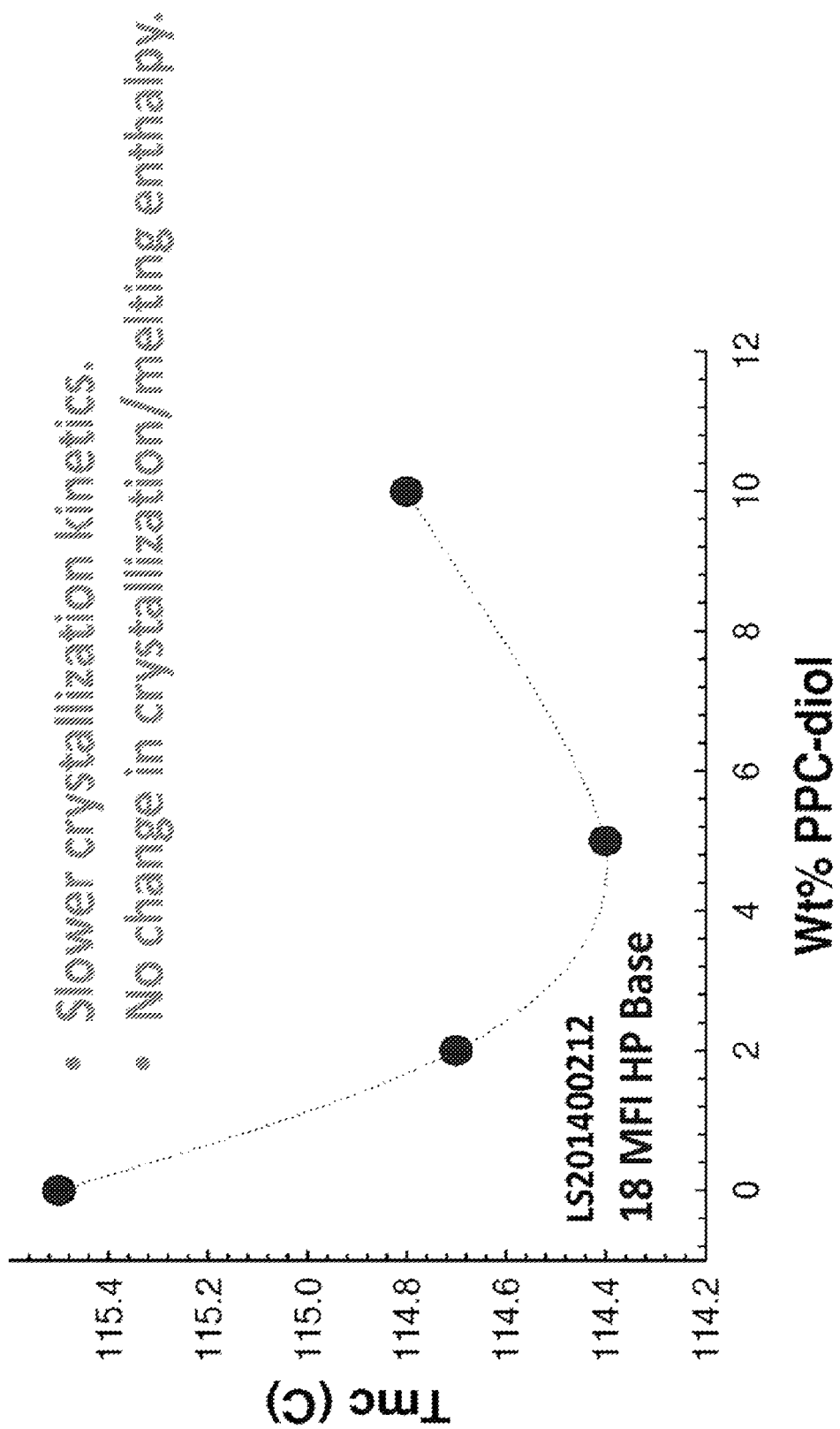
FIG. 8 illustrates the effect of the loading level (weight percentage) of PPC diol on the melting points of the comparative and inventive compositions.

Referring to FIG. 8, when the percentage of PPC diol in polypropylene (PP) homopolymer (HP) having melt index of 18 increases, the resulting compositions have a melt-crystallization temperature (Tmc) that is lower than that of the PP control. The use of PPC diol results in slower crystallization kinetics; this also suggests that the PPC-diol is being incorporated into the PP backbone thus inhibiting the rate of crystallization. No change is shown in crystallization/melting enthalpy was noted.

Example 3

In Example 3, the control PP used was a homopolymer with a melt flow index of about 3 g/10 min; this is a higher viscosity (or lower melt flow) version of the PP homopolymer used in Examples 1 and 2. In this Example, the blend composition (PP/PPC-diol/PERKADOX® 24L: 96.5/3.0/0.5) was kept constant and the compounding (melt-extrusion) conditions were varied. The compounding conditions that were varied included screw RPM and barrel set temperatures. FIGS. 9-12 show the results of comparative and inventive examples in which polypropylene (PP) homopolymer (HP) having melt index of 3 ("3 MFI HP") was used.

Figure 9:
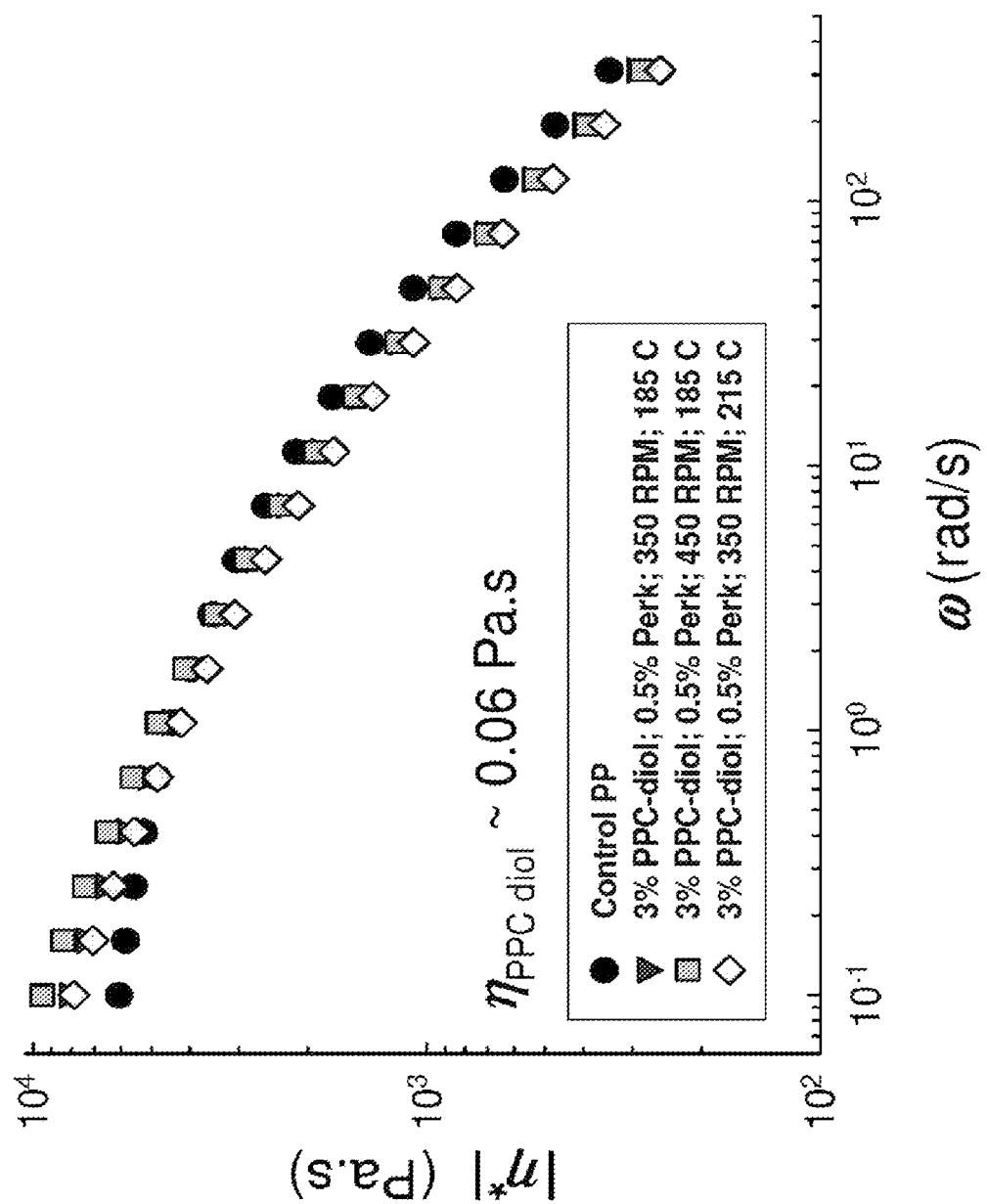
FIG. 9 illustrates complex viscosity of a polypropylene (PP) homopolymer (HP) having melt index of 3 g/10 min and an inventive composition of PP/PPC-diol/PERKADOX® 24L (96.5/3/0.5 wt %) at various twin screw extrusion temperatures and screw RPM during the melt-blending.

Referring to FIG. 9, complex viscosity of a comparative example and an inventive example as a function of angular frequency were measured under different testing conditions. The inventive composition comprises the PP ("3 MFI HP"), 3 wt. % PPC diol, and 0.5 wt. % of PERKADOX® 24L, which is an organic peroxide (diacetyl peroxydicarbonate) from Akzo Nobel. Similar to the results shown in Examples 1 and 2, using PPC diol in PP results in a decrease in high-shear viscosity and an increase in low-shear viscosity.

Figure 10:
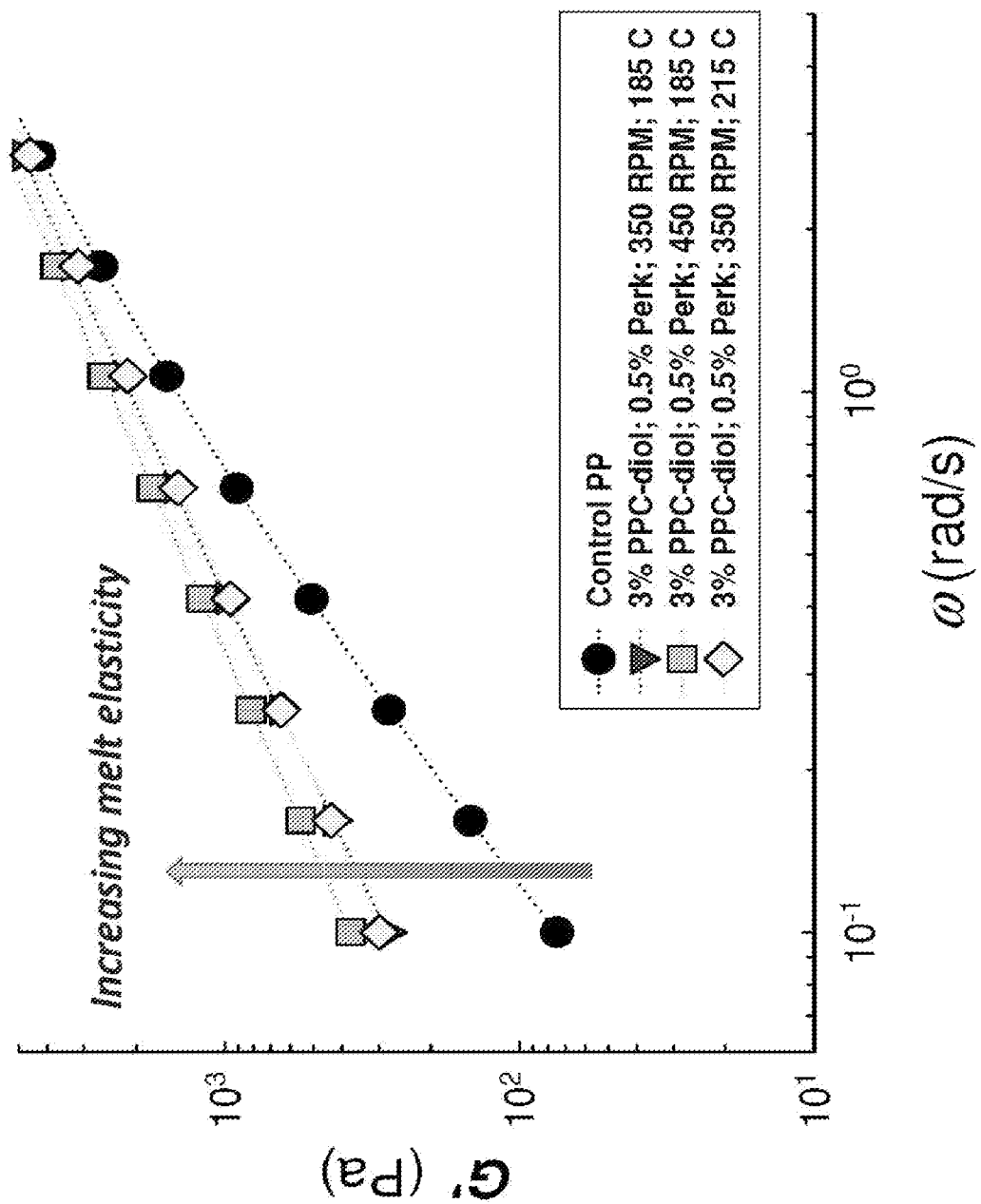
FIG. 10 illustrates the relationship between storage modulus (G') and angular frequency (from torsional rheology measurements) of the control and the inventive composition of PP/3% PPC-diol/0.5% PERKADOX® 24L under the same testing conditions shown in FIG. 9.
Figure 11:
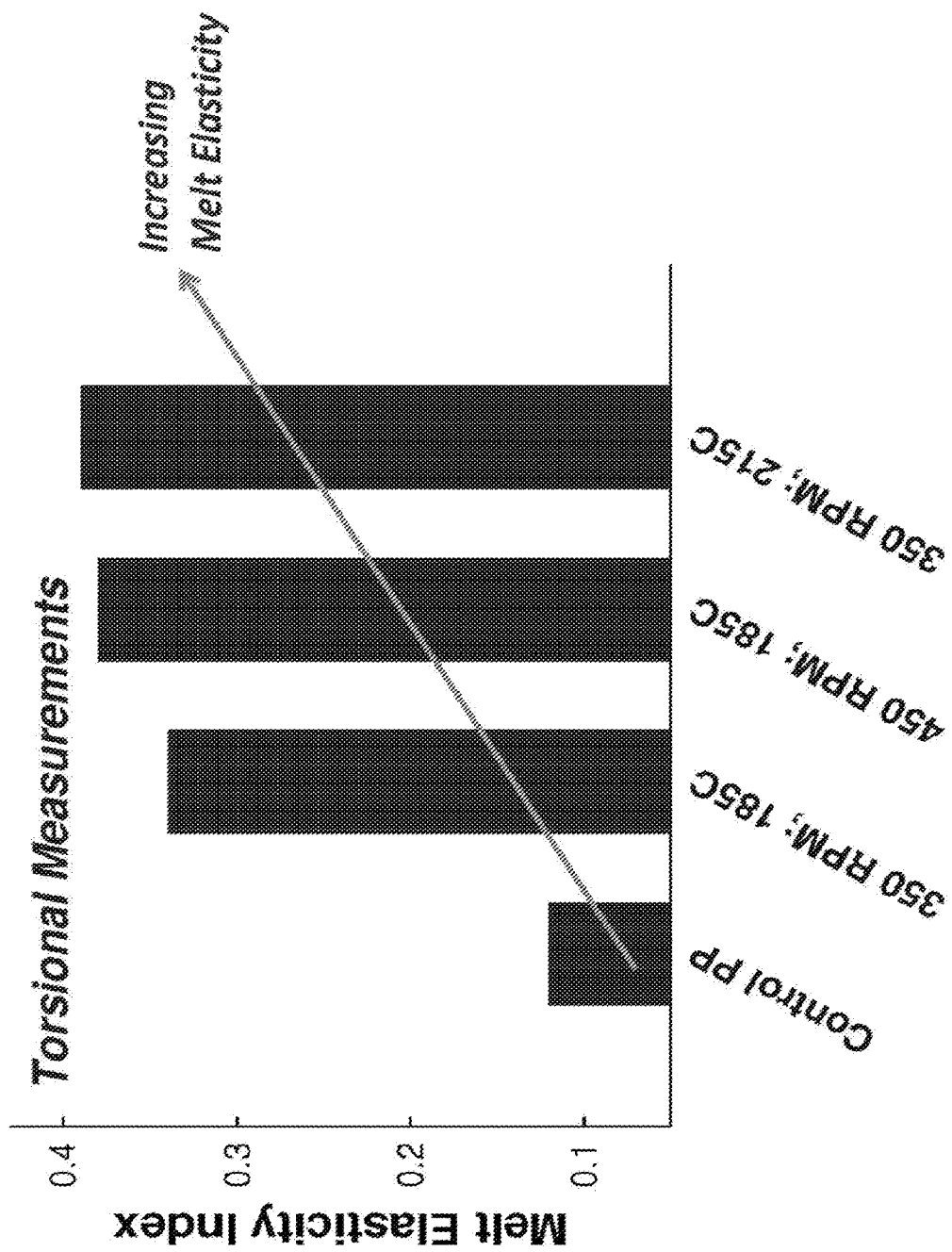
FIG. 11 illustrates the melt elasticity index [(G')/(Freq.Eta*)] at a measurement frequency of 0.25 rad/s for the control and the inventive composition of PP/3% PPC-diol/0.5% Perk under the same testing conditions shown in FIG. 9.
Figure 12:
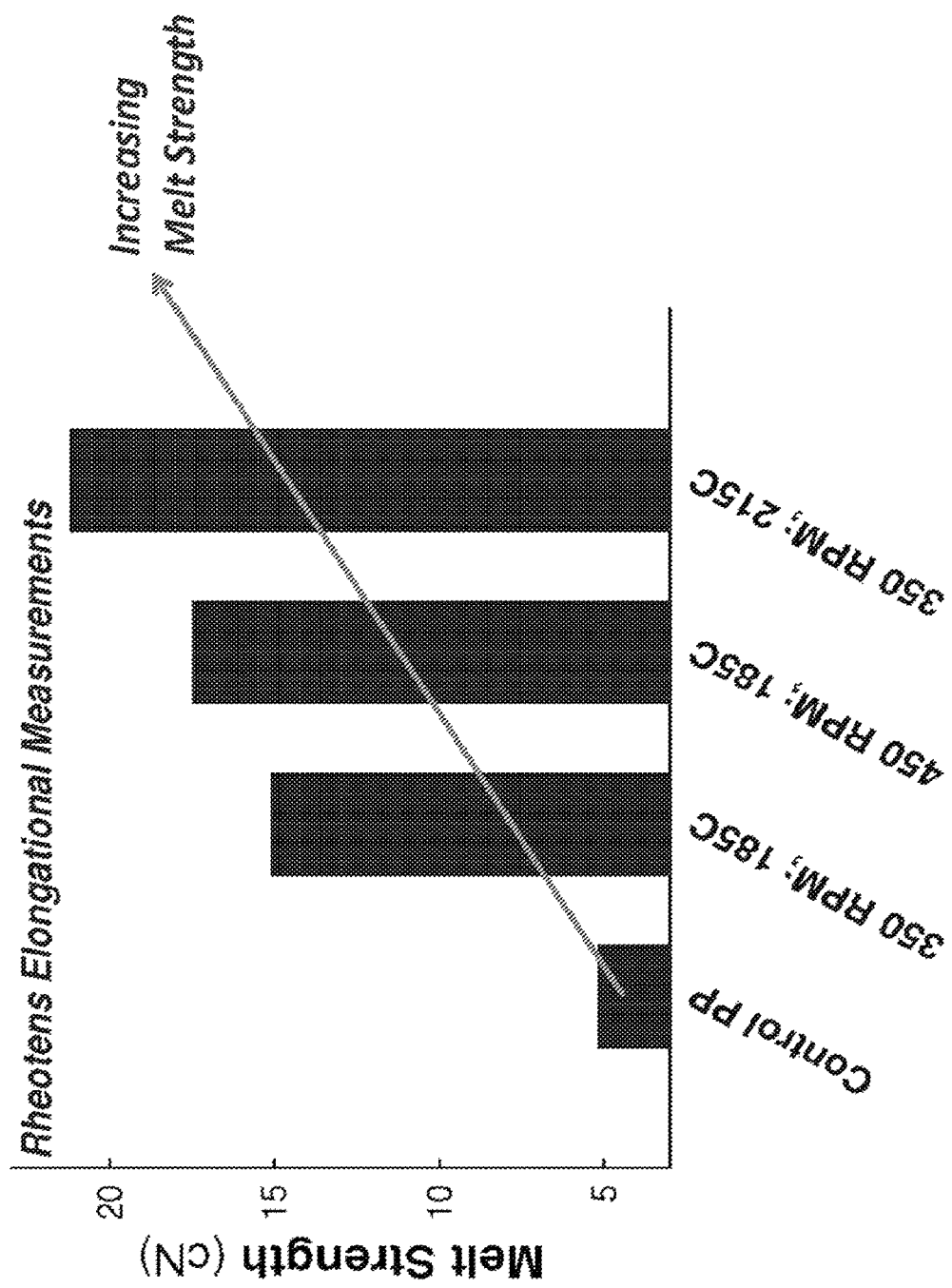
FIG. 12 illustrates the melt strength (measured using the Rheotens test) of the control and the inventive composition of PP/3% PPC-diol/0.5% PERKADOX® 24L under the same testing conditions shown in FIG. 9.

As shown in FIG. 10, based on the data of storage modulus (G') as a function of angular frequency under the same testing conditions shown in FIG. 9, the inventive composition of PP/3% PPC-diol/0.5% Perk shows significantly higher storage modulus compared to the control PP. This is also reflected in the melt elasticity parameter shown in FIG. 11, with the inventive composition showing a significantly higher melt elasticity compared to the control PP. As shown in FIG. 12, this composition also provides a significant increase in the melt strength as measured using the Rheotens test. The torsional measurements (FIGS. 9-11) and the Rheotens measurement (FIG. 12) independently show the dramatic changes and the synergy of the inventive compositions. Further, all of the measurements indicate that higher temperatures and higher screw RPM favor the extent of change in the rheological response of the inventive compositions.

Example 4

While Examples 1-3 used PP homopolymers as the control, we will use PP Impact Copolymers (PP-ICP) as controls in this example. The ICPs used are C7100-50NA and TI2350C, both commercial offerings of Braskem America. C7100-50NA is an ICP with an ethylene-rich rubber phase with a melt flow rate of about 50 g/10 min. TI2350C is an ICP with a high molecular weight propylene-rich rubber with a melt flow rate of about 40 g/10 min. FIGS. 13-21 show the testing results of inventive compositions comprising an ICP polypropylene based polymer and a PPC diol in accordance with some embodiments. The PPC diol used is Novomer 211-10 described above. The torsional rheology results of the compositions comprising C7100-50NA are shown FIGS. 13-14. The torsional rheology results of the compositions comprising TI2350C are shown FIGS. 15-16. The mechanical property (tensile and impact) results of the compositions comprising C7100-50NA and TI2350C are compared in FIGS. 18-21.

Figure 13:
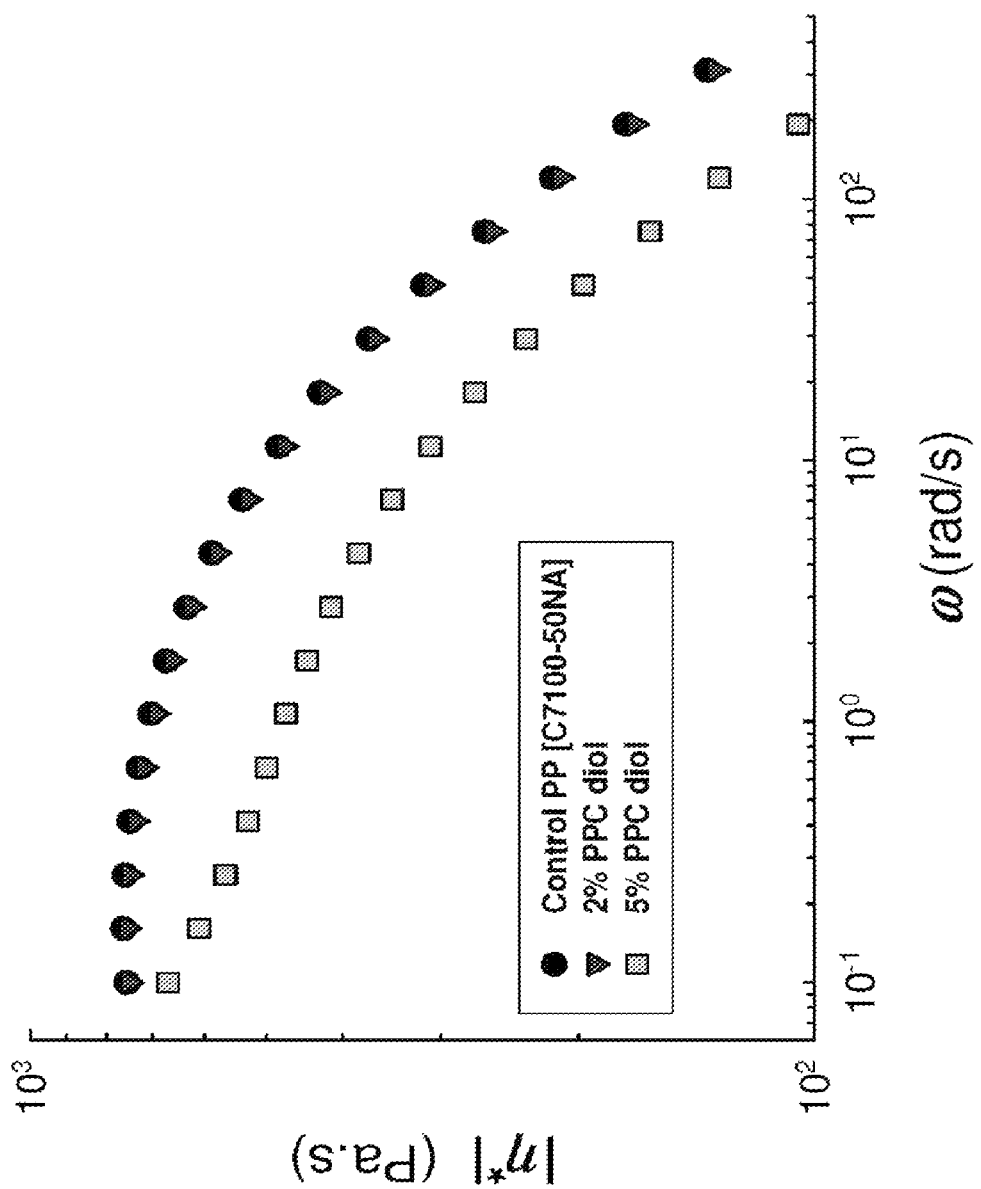
FIG. 13 illustrates dynamic rheology response (plotted as complex viscosity or Eta* versus measurement frequency at 200° C.) of an ICP polypropylene based polymer (C7100-50NA) as a control and a corresponding inventive composition comprising PPC-diol.
Figure 14:
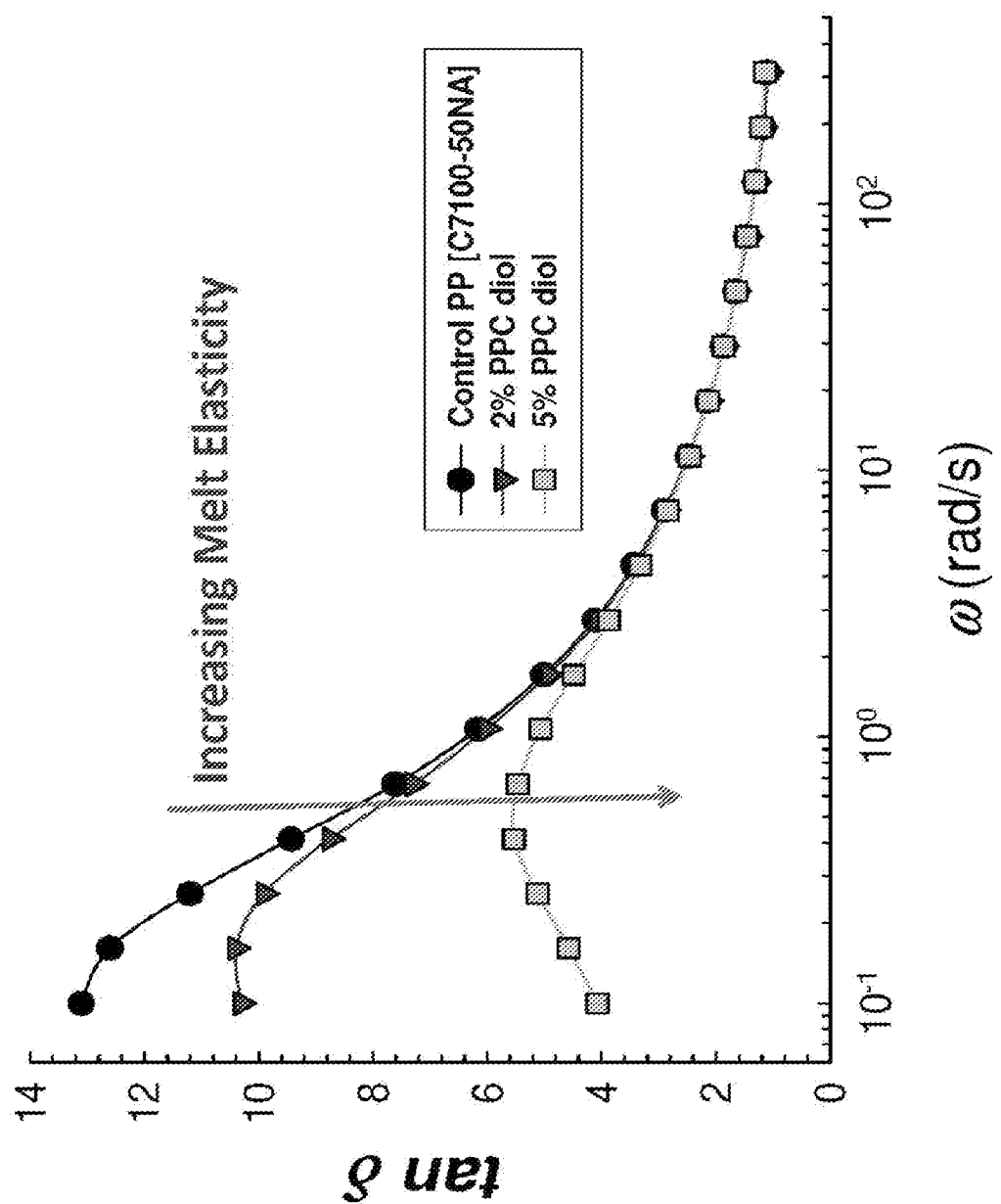
FIG. 14 illustrates dynamic rheology response (plotted as loss tangent versus measurement frequency at 200° C.) of the ICP polypropylene based polymer (C7100-50NA) and the corresponding inventive composition comprising PPC-diol

Referring to FIG. 13, an inventive composition comprising an ICP polypropylene based polymer (C7100-50NA) and 5% PPC diol has a lower complex viscosity at high frequencies than that of the control; however, the low-frequency viscosity of this sample shows a dramatic increase that is consistent with observations discussed for the previous Examples. Based on the data of loss tangent shown in FIG. 14, the inventive compositions comprising C7100-50NA and 2% or 5% PPC diol display substantially higher melt elasticity compared to the C7100-50NA PP control. This is also consistent with the observations discussed for the homopolymer examples.

Figure 15:
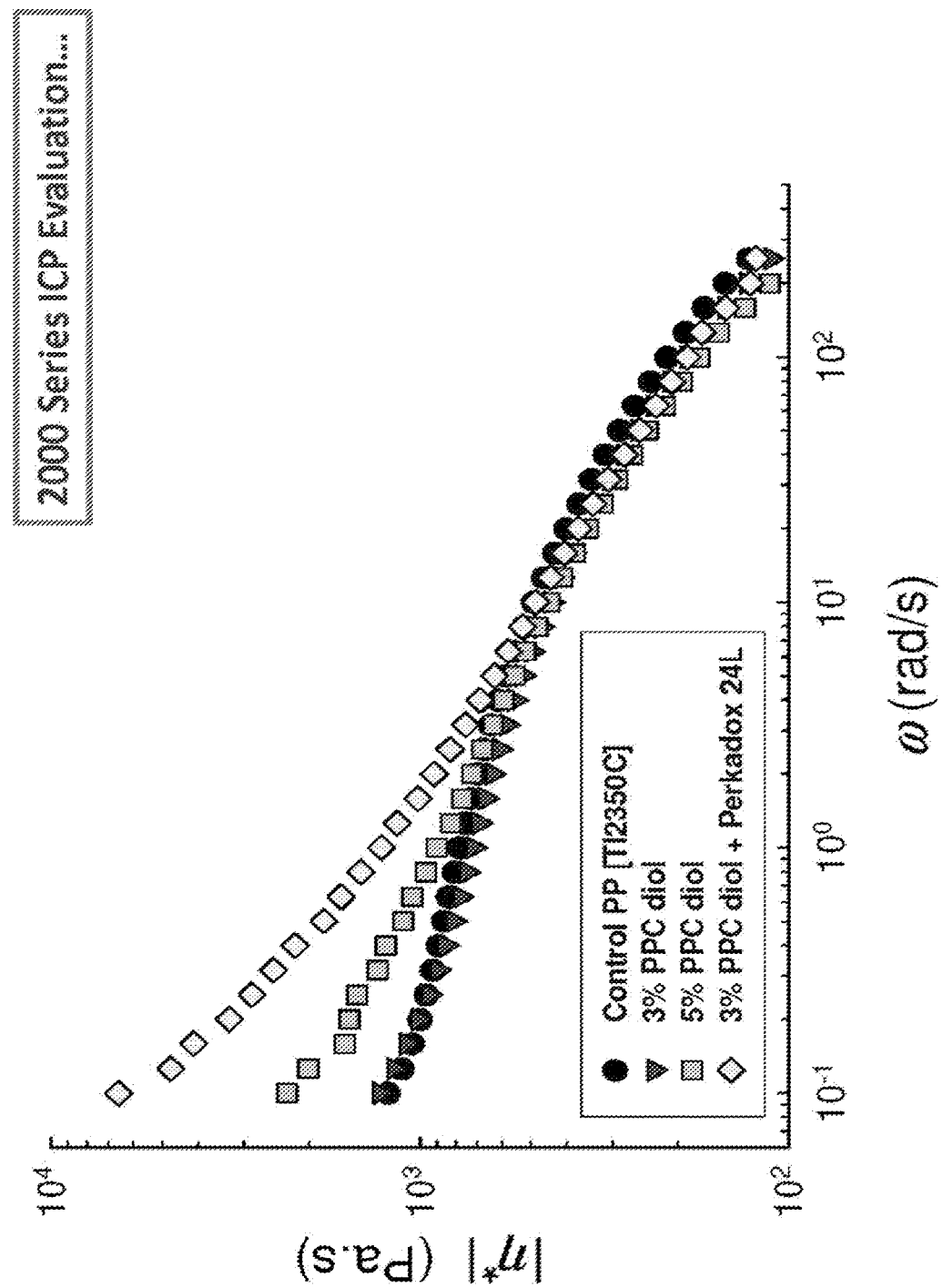
FIG. 15 illustrates dynamic rheology response [plotted as complex viscosity or Eta* versus measurement frequency at 200° C.) of another ICP polypropylene based polymer (TI2350C) as a control and a corresponding inventive composition comprising PPC-diol.

Referring to FIG. 15, another ICP polypropylene based polymer (TI2350C) was used as a control and the base for corresponding inventive compositions comprising PPC-diol. These compositions provide increased complex viscosity at lower shear rate, especially when the content of PPC diol is equal to or higher than 3 wt. %. The dramatic increase in low-shear viscosity suggests a substantial change in the architecture (long chain branching) of the ICP with the behavior that is consistent with previous examples.

Figure 16:
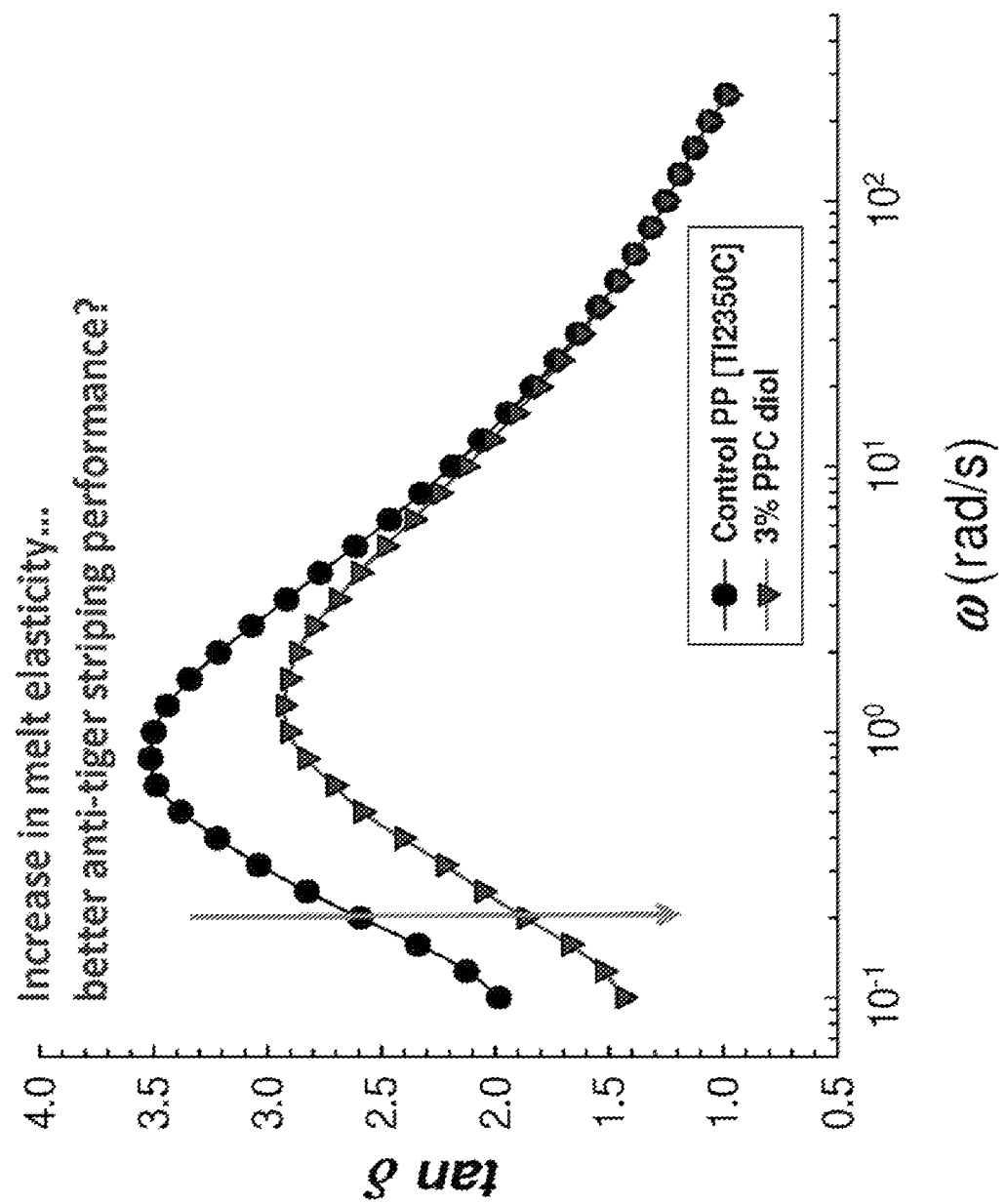
FIG. 16 illustrates dynamic rheology response (plotted as loss tangent versus measurement frequency at 200° C.) of the ICP polypropylene based polymer (TI2350C) and the corresponding inventive composition comprising PPC-diol.

As shown in FIG. 16, based on the loss tangent data, the inventive composition comprising TI2350C and 3 wt. % of PPC-diol shows increased melt elasticity, and consequently improved anti-tiger striping performance.

Figure 17:
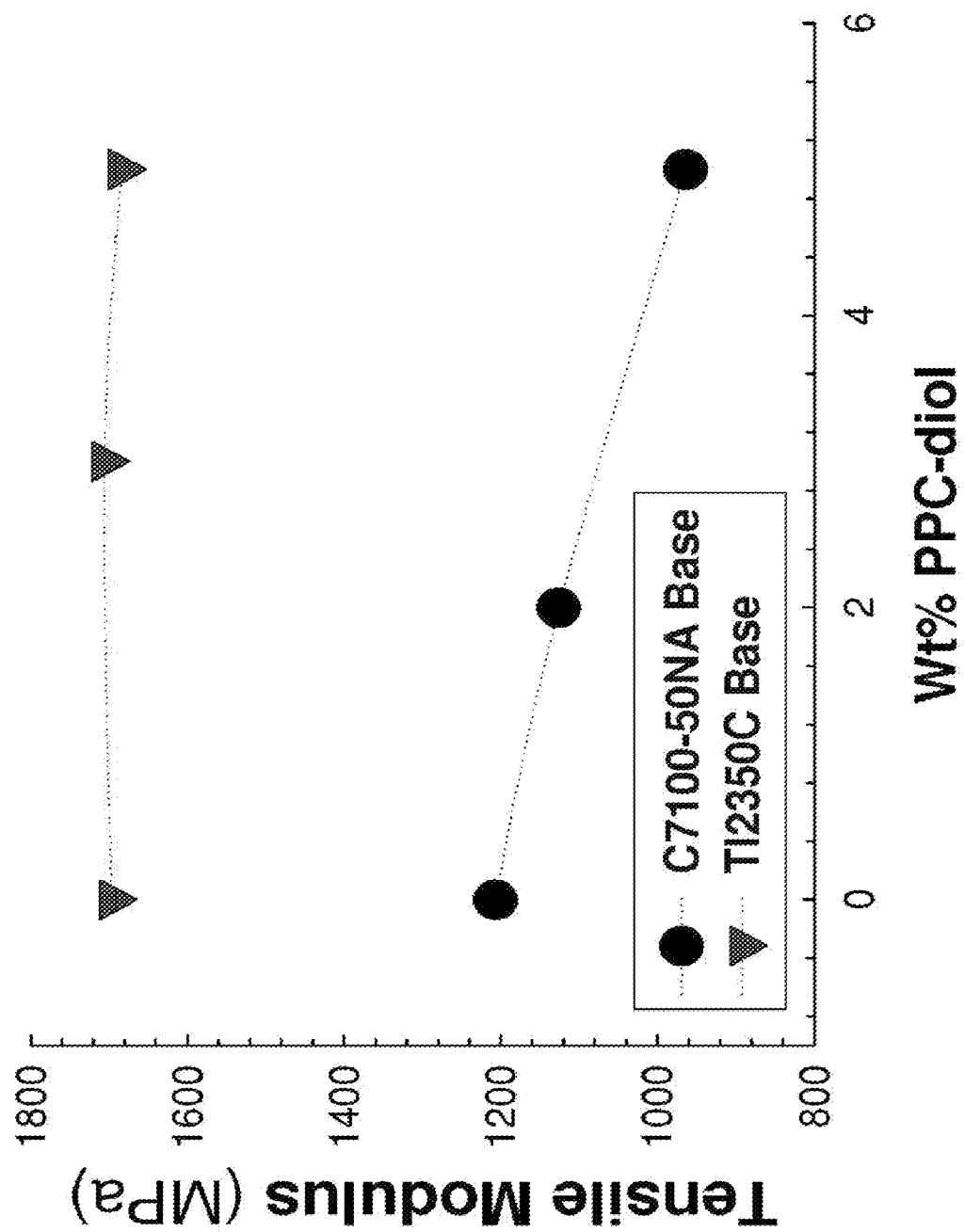
FIG. 17 illustrates the effect of the percentage of PPC diol on the tensile stress of the ICP polypropylene based comparative and inventive compositions.
Figure 18:
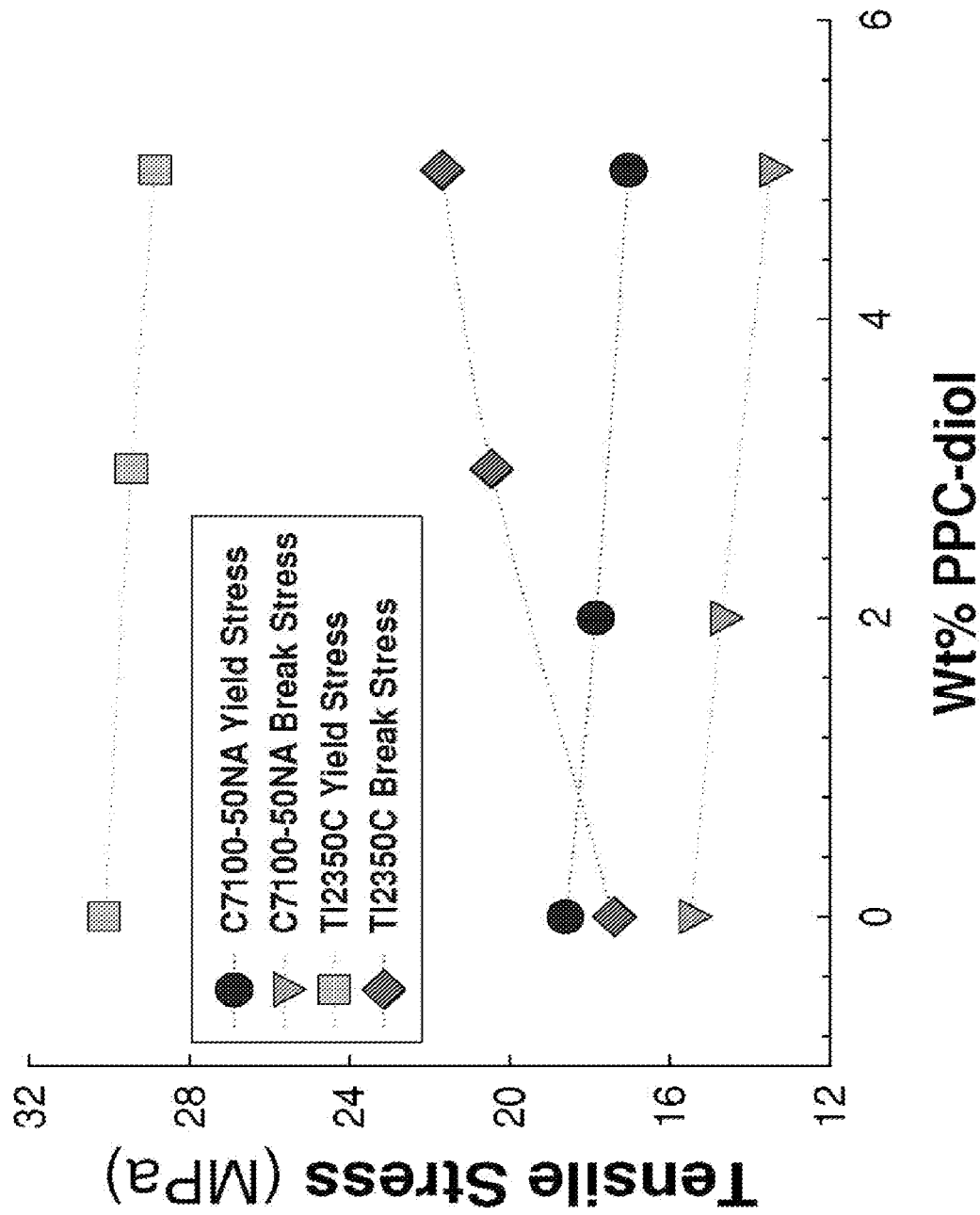
FIG. 18 compares the yield stress and the tensile stress of the ICP polypropylene based comparative and inventive compositions as a function of the percentage of PPC diol.

As shown in FIG. 17, with the increase in the content of PPC diol, the tensile modulus of either C7100-50NA or TI2350C based inventive compositions decreases slightly. Meanwhile, as shown in FIG. 18, the yield stress also tends to decrease while the break stress may increase or decrease.

Figure 19:
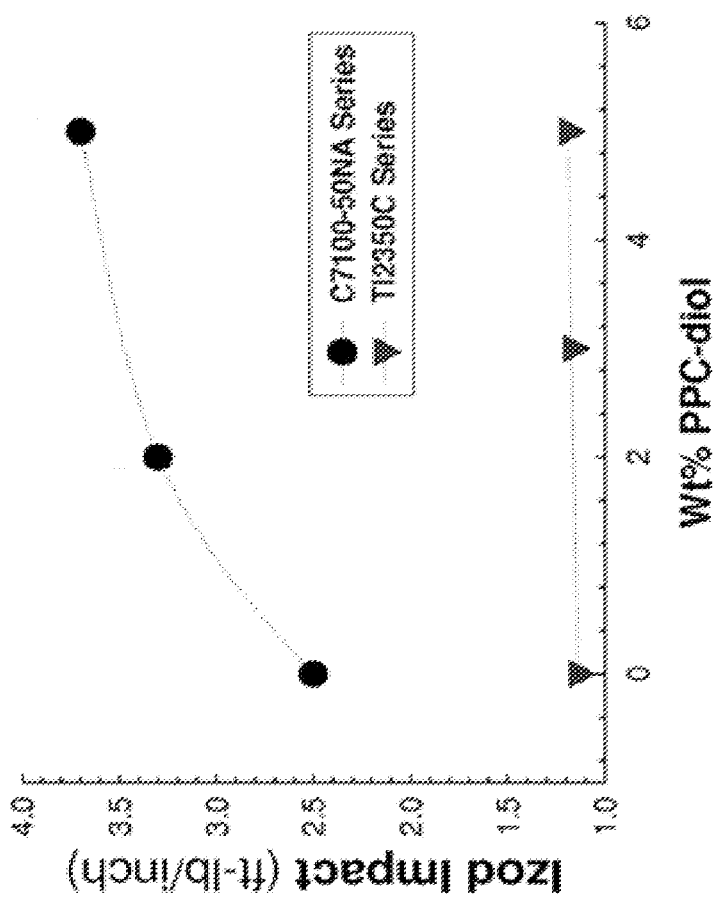
FIG. 19 illustrates the impact toughness of the ICP based comparative and inventive compositions as a function of the percentage of PPC diol.

As shown in FIG. 19, with the increase in the content of PPC diol, the impact toughness of C7100-50NA based inventive compositions increases significantly. In fact, the fracture mode changes from brittle for the control 7100-50NA to partial-break or ductile for the inventive composition. This change in fracture mode is considerably more significant compared to the 40-50% increase in the reported Izod impact strength. While the C7100-50NA/PPC-diol blends showed significant improvement in impact toughness, the TI2350C based inventive compositions have impact toughness similar to that of control.

Figure 20:
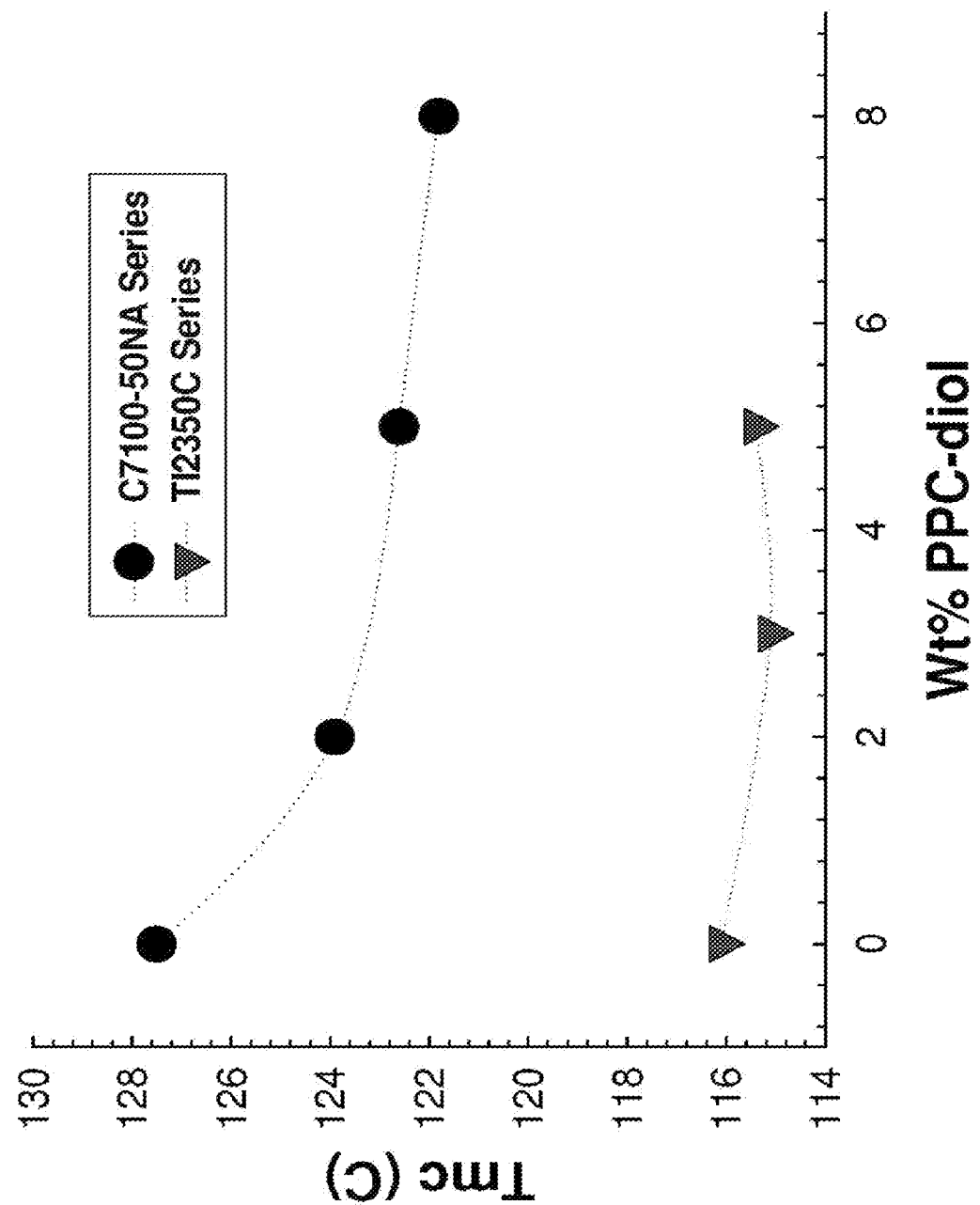
FIG. 20 illustrates the melting points of the ICP based comparative and inventive compositions as a function of the percentage of PPC diol.

As shown in FIG. 20, with the increase in the content of PPC diol, the melt-crystallization temperature or Tmc of either C7100-50NA or TI2350C based inventive compositions decreases, especially for the C7100-50NA based compositions.

Based on the experimental results, the inventors have surprisingly found that polyol such as PPC diol can be mixed with, and/or even react with, PP or a PP based polymer very well. The inventive compositions display unique rheological behavior with higher degree of shear thinning and higher melt elasticity with the introduction of polycarbonate diol such as PPC diol. The inventive compositions also provide high melt strength (when peroxide such as PERKADOX® is or is not used), and slower melt crystallization kinetics. Achieving high melt strength has always been a significant challenge for PP because of it tendency to undergo chain scission reactions in the melt. The examples discussed provide a novel approach to create PP with high melt strength. In some instances, such as with certain ICPs, a dramatic improvement in impact toughness in noted; it is important to note that the impact strength improvement is achieved at a modest decrease in modulus. This can allow the commercialization of ICPs that display a better balance of stiffness and impact that has not been achieved to date.

Introducing some polarity into the PP can also lead to significant advantages for applications where PP is used today.

In some embodiments, polycarbonate polyol having —OH functionality of higher than 2 (e.g., 3-5) can be also used. In some embodiments, polycarbonate polyol having —OH functionality of higher than 2 (e.g., 3-5) can be combined with PP or a PP based polymer for foaming and/or deep-draw thermoforming.

Examples 5-6

Table 1 shows the formulations (by weight) and testing results of Examples 5-6 and Comparative Example 4. INSPIRE™ 6021N is a commercial grade of polypropylene homopolymer sold by Braskem, and has a melt index of 2. In Examples 5-6, a polycarbonate diol 212-10 and a polycarbonate triol 312-15 were used. These formulations were prepared using the twin-screw extruder shown in FIG. 1B and described above. Nitrogen was feed into all hoppers for the ingredients, and atmospheric venting was activated. Three upstream feeders, F1, F2 and F3 were used to feed solid ingredients into the main hopper. Together with a liquid pump, a downstream feeder, F4, which was heated, was used to feed the polyol in the form of liquid. INSPIRE™ 6021N powder was added through F1. In feeder F2, a blend of an additive blend and a PERKADOX® 24L containing master batch (MB) at a ratio of 5:2 by weight was added. PERKADOX® 24L MB was a blend containing the base polymer and PERKADOX® 24L (90/10 by weight). ULTEANOX® 626 is also a peroxide (CAS#26741-53-7). The processing temperatures in zones 1-6 (Z1-6) are listed in Table 1. All the percentages in Table 1 are by weight of the total formulation. The content of PERKADOX® 24L is 0.4% by weight in the formulation. Max EVel. (mm/s) The maximum extension velocity (Max EVel.) is the linear speed at which the strand that is being drawn in the Rheotens melt strength test breaks. While melt strength is the peak force in the Force-Speed curve of the Rheotends test, the maximum extension velocity is the speed at which the strand breaks. Compared to Comparative Example 4 without polycarbonate polyol, Examples 5-6 show significantly higher melt strength, modulus, and elasticity index.

TABLE 1

| Ingredient | Comparative Example 4 | Example 5 | Example 6 |
|---|---|---|---|
| INSPIRE™ 6021N Powder | 99.2 | 96.2 | 96.2 |
| PERKADOX ®24L Peroxide | 0.4 | 0.4 | 0.4 |
| IRGANOX ® 1010 | 0.15 | 0.15 | 0.15 |
| ULTEANOX ® 626 | 0.15 | 0.15 | 0.15 |
| Calcium Stearate | 0.1 | 0.1 | 0.1 |
| PPC Diol 212-10 | 0 | 3 | 0 |
| PPC Triol 312-15 | 0 | 0 | 3 |
| Total (wt %) | 100 | 100 | 100 |
| Z1-Z3 Temp (° C.) | 216 | 216 | 216 |
| Z4-Z6 Temp (° C.) | 204 | 204 | 204 |
| Rate (Kg/hr) | 6.8 | 6.8 | 6.8 |
| Screw RPM | 350 | 350 | 350 |
| MFI (dg/min) | 3.1 | 1.7 | 1.6 |
| Melt Strength (cN) | 10 | 17 | 17 |
| Max EVel. (mm/s) | 134 | 137 | 132 |
| tan δ @ 0.1 rad/s | 3 | 2.4 | 2.4 |
| G' @ 0.1 rad/s (Pa) | 262 | 381 | 503 |
| Eta* @ 0.1 (Pa · s) | 8372 | 9973 | 12899 |
| Elasticity Index | 313 | 382 | 390 |
| Tmc | 125.1 | 126.1 | 126.9 |
| dHmc (J/g) | 104 | 103 | 106 |

Examples 7-8

Table 2 shows the formulations (by weight) and testing results of Examples 7-8 and Comparative Example 4. Examples 7-8 are similar to Examples 5-6, except that a high molecular weight polyester based polyol (caprolactone polyol) CAPA™ 6400 was used. CAPA™ 6400 has a molecular weight (Mn) of about 37,000 g/mol, a melting point of 59° C. The preparation procedures were similar to those used for Examples 5-6 as described above, except that there is no liquid feeder used. INSPIRE™ 6021N powder was added through F1. A blend of an additive blend PERKADOX® 24L MB (master batch) at a ratio of 5:2 by weight was added through F2. PERKADOX® 24L MB was a blend containing D18082 and PERKADOX® 24L (90/10 by weight). CAPA™ 6400 in the form of solid pellet was fed through F3. Compared to Comparative Example 4 without polycarbonate polyol, Examples 7-8 show significantly higher melt strength, modulus, and elasticity index.

TABLE 2

| Ingredient | Comparative 4 | Example 7 | Example 8 |
|---|---|---|---|
| INSPIRE™ 6021N Powder | 99.2 | 96.2 | 94.2 |
| PERKADOX ®24L Peroxide | 0.4 | 0.4 | 0.4 |
| IRGANOX ® 1010 | 0.15 | 0.15 | 0.15 |
| ULTEANOX ® 626 | 0.15 | 0.15 | 0.15 |
| Calcium Stearate | 0.1 | 0.1 | 0.1 |
| CAPA 6400 [PCL diol] | 0 | 3 | 5 |
| Total (wt %) | 100 | 100 | 100 |
| Z1-Z3 Temp (° C.) | 216 | 216 | 216 |
| Z4-Z6 Temp (° C.) | 204 | 204 | 204 |
| Rate (Kg/hr) | 6.8 | 6.8 | 6.8 |
| Screw RPM | 350 | 350 | 350 |
| MFI (dg/min) | 3.1 | 1.6 | 1.6 |
| Melt Strength (cN) | 10 | 21 | 26 |
| Max EVel. (mm/s) | 134 | 126 | 126 |
| tan δ @ 0.1 rad/s | 3 | 2.2 | 2.0 |
| G' @ 0.1 rad/s (Pa) | 262 | 623 | 677 |
| Eta* @ 0.1 (Pa · s) | 8372 | 14761 | 15040 |
| Elasticity Index | 313 | 422 | 450 |
| Tmc | 125.1 | 129.0 | 129.0 |
| dHmc (J/g) | 104 | 98 | 96 |

Examples 9-12

Table 3 shows the formulations (by weight) and testing results of Examples 9-12 and Comparative Examples 5-6. INSPIRE™ 6021N, a commercial grade of polypropylene homopolymer, was used. Polyol 3165, a liquid alkoxylated polyol having a molecular weight of about 1010 g/mole was used. These formulations were prepared using the twin-screw extruder shown in FIG. 1B and described above. Nitrogen was feed into all hoppers, and atmospheric venting was activated. Three upstream feeders, F1, F2 and F3 were used to feed solid ingredients including INSPIRE™ 6021N, an additive blend, and PERKADOX® 24L MB, respectfully. A liquid feeder, F4, which was maintained at room temperature, was used to feed Polyol 3165. PERKADOX® 24L MB was a blend containing INSPIRE™ 6021N and PERKADOX® 24L (90/10 by weight). The additive blend contained 96 wt. % of INSPIRE™ 6021N, 1.0 wt. % Calcium stearate, 1.5 wt. % of IRGANOX® 1010, and 1.5 wt. % of AO626. The processing temperatures in zones 1-6 (Z1-6) are listed in Table 1. The content of PERKADOX® 24L is 0.4% by weight of the total weight of the formulation. Compared to Comparative Examples 5-6 without polycarbonate polyol, Examples 9-12 show significantly higher melt strength, modulus, and elasticity index.

TABLE 3

| Ingredient | Comparative Example 5 | Comparative Example 6 | Example 9 | Example 10 | Example 11 | Example 12 |
|---|---|---|---|---|---|---|
| INSPIRE ™ 6021N Powder | 99.2 | 95.2 | 93.2 | 91.2 | 89.2 | 90.2 |
| PERKADOX ® 24L Peroxide | 0.4 | 0.4 | 0.4 | 0.4 | 0.4 | 0.4 |
| IRGANOX ® 1010 | 0.15 | 0.15 | 0.15 | 0.15 | 0.15 | 0.15 |
| ULTEANOX ® 626 | 0.15 | 0.15 | 0.15 | 0.15 | 0.15 | 0.15 |
| Calcium Stearate | 0.1 | 0.1 | 0.1 | 0.1 | 0.1 | 0.1 |
| PERKADOX ® 24L-MB | 0 | 4 | 4 | 4 | 4 | 4 |
| Polyol 3165 | 0 | 0 | 2 | 4 | 6 | 5 |
| Total (wt %) | 100 | 100 | 100 | 100 | 100 | 100 |
| Z1-Z3 Temp (° C.) | 216 | 216 | 216 | 216 | 216 | 216 |
| Z4-Z6 Temp (° C.) | 204 | 204 | 204 | 204 | 204 | 204 |
| Rate (Kg/hr) | 6.8 | 6.8 | 6.8 | 6.8 | 6.8 | 6.8 |
| Screw RPM | 350 | 350 | 350 | 350 | 350 | 350 |
| Torque (%) | 31 | 23 | 18 | 18 | 18 | 17 |
| MFI (dg/min) | 1.9 | 3.1 | 2.3 | 4.7 | 4.2 | 4.8 |
| Melt Strength (cN) | 9 | 10 | 24 | 17 | 21 | 21 |
| Max EVel. (mm/s) | 119 | 134 | 134 | 144 | 147 | 142 |
| tan δ @ 0.1 rad/s | 3.4 | 3.0 | 2.0 | 2.2 | 1.8 | 1.8 |
| G' @ 0.1 rad/s (Pa) | 350 | 262 | 533 | 395 | 491 | 506 |
| Eta* @ 0.1 (Pa · s) | 12462 | 8372 | 12095 | 8496 | 10228 | 10299 |
| Elasticity Index | 281 | 313 | 441 | 465 | 480 | 491 |
| Tmc | 118.5 | 125.1 | 125.3 | 124.9 | 122.5 | 125.4 |
| dHmc (J/g) | 101 | 104 | 102 | 99 | 98 | 97 |

Examples 13-16

Table 4 shows the formulations (by weight) and testing results of Examples 13-16 and Comparative Examples 7-9. The inventive examples, which comprise a peroxide and a polyol, display much higher melt strength, compared to the comparative examples without any polyol (and with or without a peroxide).

TABLE 4

| Ingredient | C. Ex. 7 | C. Ex. 8 | C. Ex. 9 | Ex. 13 | Ex. 14 | Ex. 15 | Ex. 16 |
|---|---|---|---|---|---|---|---|
| INSPIRE ™ 6021N Powder | 99.6 | 99.4 | 99.2 | 96.4 | 96.2 | 96 | 96 |
| PERKADOX ® 24L Peroxide | 0 | 0.2 | 0.4 | 0.2 | 0.4 | 0.6 | 0.6 |
| IRGANOX ® 1010 | 0.15 | 0.15 | 0.15 | 0.15 | 0.15 | 0.15 | 0.15 |
| ULTEANOX ® 626 | 0.15 | 0.15 | 0.15 | 0.15 | 0.15 | 0.15 | 0.15 |
| Calcium Stearate | 0.1 | 0.1 | 0.1 | 0.1 | 0.1 | 0.1 | 0.1 |
| CAPA 6400 [PCL diol] | 0 | 0 | 0 | 0 | 0 | 0 | 3 |
| Polyol 3165 | 0 | 0 | 0 | 3 | 3 | 3 | 0 |
| Total (wt. %) | 100 | 100 | 100 | 100 | 100 | 100 | 100 |
| Z1-Z3 Temp (° C.) | 216 | 216 | 216 | 216 | 216 | 216 | 216 |
| Z4-Z6 Temp (° C.) | 216 | 216 | 216 | 216 | 216 | 216 | 216 |
| Rate (Kg/hr) | 6.8 | 6.8 | 6.8 | 6.8 | 6.8 | 6.8 | 6.8 |

TABLE 4-continued

| Ingredient | C. Ex. 7 | C. Ex. 8 | C. Ex. 9 | Ex. 13 | Ex. 14 | Ex. 15 | Ex. 16 |
|---|---|---|---|---|---|---|---|
| Screw RPM | 350 | 350 | 350 | 350 | 350 | 350 | 350 |
| Torque (%) | 41 | 40 | 44 | 18 | 18 | 21 | 21 |
| Melt Fracture | none | none | none | yes | strong | severe | severe |
| Tm (F.) | 449 | 442 | 441 | 435 | 437 | 434 | 434 |
| MFI (dg/min) | 2.3 | 2.4 | 1.8 | 2.7 | 2.5 | 2.1 | 2.1 |
| Melt Strength (cN) | 8 | 9 | 14 | 14 | 32 | 37 | 37 |
| Max EVel. (mm/s) | 117 | 144 | 148 | 145 | 140 | 148 | 148 |

In a preferred embodiment, the resulting material provides an IZOD impact resistance (notched) of 3.5 ft-lb/inch or above. This level of impact resistance has been only achieved through the compositions and methods disclosed in the present disclosure, especially a ICP polyol blend.

The present disclosure also provides a method of making the composition described above. The method comprises mixing (a) a polypropylene or a polypropylene copolymer; and (b) a polyol such as a polycarbonate polyol, polycaprolactone polyol, an alkoxylated polyol or any other polyol as described above. The method can also comprise optionally mixing an organic peroxide (c) with (a) and (b). The polyol (b) is in the range of from about 0.01 wt. % to about 25 wt. % of the total weight of (a), (b) and (c). The mixing can be achieved using regular mixing methods such as in a twin-screw extruder or a single screw extruder at an elevated temperature. In some embodiments, the polypropylene or a polypropylene copolymer (a) and the polyol (b) are directly mixed without using any compatibilizer between (a) and (b). In some embodiments, the method comprises reacting the polypropylene or a polypropylene copolymer and the polyol. The polyol such as polycarbonate diol (b) is in the range of from about 0.1 wt. % to about 10 wt. % (e.g., from about 0.1 wt. % to about 5 wt. %) of the total weight of (a), (b) and (c). In some embodiments, the polycarbonate diol is a poly(propylene carbonate) diol.

An organic peroxide (c) if used can be in the range from about 0.01 wt. % to about 5 wt. %, for example, from about 0.01 wt. % to about 2 wt. % or about 0.1 wt. % to about 1 wt. %. Optionally a curing agent, a filler, an additive, or any other suitable ingredient, or combinations thereof can be mixed into the inventive compositions.

The present disclosure also provides a method of using the composition provided in this invention. Such a composition can be used as a toughness enhancer, a tiger-striping performance enhancer, a gas barrier, a paint adhesion promoter, a compatibilizer between a filler and a polymer or between two polymers, and any other material. For example, a polypropylene based polymer can be modified with a polyol to have polar —OH groups and therefore polarity to a certain degree. The modified PP based polymer can be used to improve gas barrier properties of a packaging material through hydrogen bonding. Similar methods can be also used to make a paint adhesion promoter comprising thermoplastic elastomer (TPO). Similarly modified compound can be used as a compatibilizer for a PP containing cellulosic composites, glass fibers, aramid fibers, and other fillers. The modified compositions can be also used to improve compatibility of a PP based polymer and other polymers such as PET and nylon.

In another respect, the present disclosure provides a fabricated article and a method for making the fabricated article, which comprises the composition described above. Examples of a resulting article include but are not limited to a film (for example for packaging), a molded part, and any other suitable article or combination thereof.

Although the subject matter has been described in terms of exemplary embodiments, it is not limited thereto. Rather, the appended claims should be construed broadly, to include other variants and embodiments, which may be made by those skilled in the art.

What is claimed is:

1. A composition comprising:
    (a) a polypropylene, a polypropylene copolymer or a polypropylene impact copolymer; and
    (b) a polyol; and
    (c) optionally an organic peroxide
    wherein the polyol (b) is in the range of from about 0.01 wt. % to about 25 wt. % of the total weight of (a), (b), and (c), and wherein
    the polyol is a polycarbonate polyol, a polycaprolactone polyol, or a polyester based polyol.

2. The composition of claim 1, wherein the polyol (b) is in the range of from about 0.1 wt. % to about 10 wt. % of the total weight of (a), (b) and (c).

3. The composition of claim 1, wherein the polyol (b) is in the range of from about 0.1 wt. % to about 5 wt. % of the total weight of (a), (b) and (c).

4. The composition of claim 1, wherein no compatibilizer is present between (a) the polypropylene or the polypropylene copolymer; and (b) polyol.

5. The composition of claim 1, wherein the polyol has a functionality between 1 and 10.

6. The composition of claim 1, wherein the polyol is a polycarbonate polyol selected from the group consisting of a polycarbonate diol, a polycarbonate triol, and a combination thereof.

7. The composition of claim 1, wherein the polyol is a poly(propylene carbonate) diol or polyethylene carbonate polyol.

8. The composition of claim 1, wherein the polyol is a poly(propylene carbonate) diol.

9. The composition of claim 1, wherein the polyol is a poly(propylene carbonate) diol having alternating copolymer structure.

10. The composition of claim 1, wherein the polyol has a molecular weight in the range of from 500 g/mol to 50,000 g/mol.

11. The composition of claim 1, wherein the composition has an IZOD impact resistance of equal to or higher than 3.5 ft-lb/inch.

12. A method of making the composition of claim 1, comprising:
    mixing (a) a polypropylene, a polypropylene copolymer or a polypropylene impact copolymer; (b) a polyol; and (c) optionally an organic peroxide, wherein the polyol (b) is in the range of from about 0.01 wt. % to about 25 wt. % of the total weight of (a), (b) and (c), and wherein the polyol is a polycarbonate polyol, a polycaprolactone polyol, or a polyester based polyol.

13. The method of claim 12, wherein
(a) the polypropylene or a polypropylene copolymer; and
(b) the polyol are directly mixed without using any compatibilizer between (a) and (b).

14. The method of claim 12, further comprising reacting (a) the polypropylene or a polypropylene copolymer; and (b) the polyol.

15. The method of claim 12, wherein the polyol (b) is in the range of from about 0.1 wt. % to about 10 wt. % of the total weight of (a), (b) and (c).

16. The method of claim 12, wherein the polyol (b) is in the range of from about 0.1 wt. % to about 5 wt. % of the total weight of (a), (b) and (c).

17. The method of claim 12, wherein the polyol is a polycarbonate polyol selected from the group consisting of a polycarbonate diol, a polycarbonate triol, and a combination thereof.

18. The method of claim 12, wherein the polyol is a poly(propylene carbonate) diol or polyethylene carbonate polyol.

19. A method of using the composition of claim 1, comprising fabricating an article comprising the composition of claim 1.

20. The method of claim 19, wherein the composition is used as a material selected from the group consisting of a toughness enhancer, a tiger-striping performance enhancer, a gas barrier, a paint adhesion promoter, a compatibilizer between a filler and a polymer or between two polymers.

21. A fabricated article comprising the composition of claim 1.

22. The article of claim 21, wherein the polyol (b) is in the range of from about 0.1 wt. % to about 10 wt. % of the total weight of (a), (b) and (c).

23. The article of claim 21, wherein the polyol (b) is in the range of from about 0.1 wt. % to about 5 wt. % of the total weight of (a), (b) and (c).

24. The article of claim 21, wherein no compatibilizer is present between (a) the polypropylene or the polypropylene copolymer; and (b) polyol.

25. The article of claim 21, wherein the polyol is a poly(propylene carbonate) diol.

26. The article of claim 21, wherein the polyol is a poly(propylene carbonate) diol.

27. The article of claim 21, wherein the polyol is a poly(propylene carbonate) diol having alternating copolymer structure.

* * * * *